(12) United States Patent
Schwartzentruber

(10) Patent No.: US 12,359,958 B2
(45) Date of Patent: Jul. 15, 2025

(54) BIN LEVEL MONITORING SYSTEM

(71) Applicant: BINSENTRY INC., New Hamburg (CA)

(72) Inventor: Randall Schwartzentruber, New Hamburg (CA)

(73) Assignee: BINSENTRY INC. (CA)

( * ) Notice: Subject to any disclaimer, the term of this patent is extended or adjusted under 35 U.S.C. 154(b) by 1091 days.

(21) Appl. No.: 17/295,947

(22) PCT Filed: Jul. 31, 2019

(86) PCT No.: PCT/CA2019/051044
§ 371 (c)(1),
(2) Date: May 21, 2021

(87) PCT Pub. No.: WO2020/102879
PCT Pub. Date: May 28, 2020

(65) Prior Publication Data
US 2022/0026258 A1 Jan. 27, 2022

Related U.S. Application Data

(60) Provisional application No. 62/770,897, filed on Nov. 23, 2018.

(51) Int. Cl.
| | |
|---|---|
| *G01F 23/292* | (2006.01) |
| *G01S 7/497* | (2006.01) |
| *G01S 17/894* | (2020.01) |
| *H04W 4/38* | (2018.01) |

(52) U.S. Cl.
CPC .......... *G01F 23/2928* (2013.01); *G01S 7/497* (2013.01); *G01S 17/894* (2020.01); *H04W 4/38* (2018.02); *G01S 2007/4977* (2013.01)

(58) Field of Classification Search
CPC ................................................. G01F 23/2928
See application file for complete search history.

(56) References Cited

U.S. PATENT DOCUMENTS

| | | | | |
|---|---|---|---|---|
| 4,037,527 A | * | 7/1977 | Steffen ................ | B65D 88/742 34/233 |
| 8,350,411 B2 | * | 1/2013 | Kimball ................ | H02J 7/34 307/64 |
| 2004/0031335 A1 | * | 2/2004 | Fromme ................ | G01F 22/00 73/865 |
| 2011/0003542 A1 | * | 1/2011 | Halland ................ | F26B 21/00 454/182 |

(Continued)

FOREIGN PATENT DOCUMENTS

| | | | | |
|---|---|---|---|---|
| CA | 2418521 C | * | 9/2009 | ............ G01F 23/00 |
| WO | 2017137832 A1 | | 8/2017 | |

*Primary Examiner* — Luke D Ratcliffe
*Assistant Examiner* — Clara G Chilton
(74) *Attorney, Agent, or Firm* — Condo Roccia Koptiw LLP

(57) ABSTRACT

A bin level monitoring system bin level monitoring system comprising an optical sensor for sensing a feed level inside a feed bin, a circuit board communicatively connected to the sensor for receiving a level signal from the sensor and for processing the level signal to generate bin level data, a battery for powering the circuit board and sensor, an enclosure for enclosing the circuit board and a radio transmitter for transmitting the bin level data. The sensor may be a LIDAR sensor or a time-of-flight (ToF) sensor.

18 Claims, 28 Drawing Sheets

(56) References Cited

U.S. PATENT DOCUMENTS

| | | | |
|---|---|---|---|
| 2012/0248267 A1* | 10/2012 | Spinelli | F16M 11/22 |
| | | | 248/201 |
| 2013/0293388 A1* | 11/2013 | Ingalsbe | G01F 23/00 |
| | | | 340/870.02 |
| 2016/0292990 A1* | 10/2016 | Pesz | G01F 23/0007 |

* cited by examiner

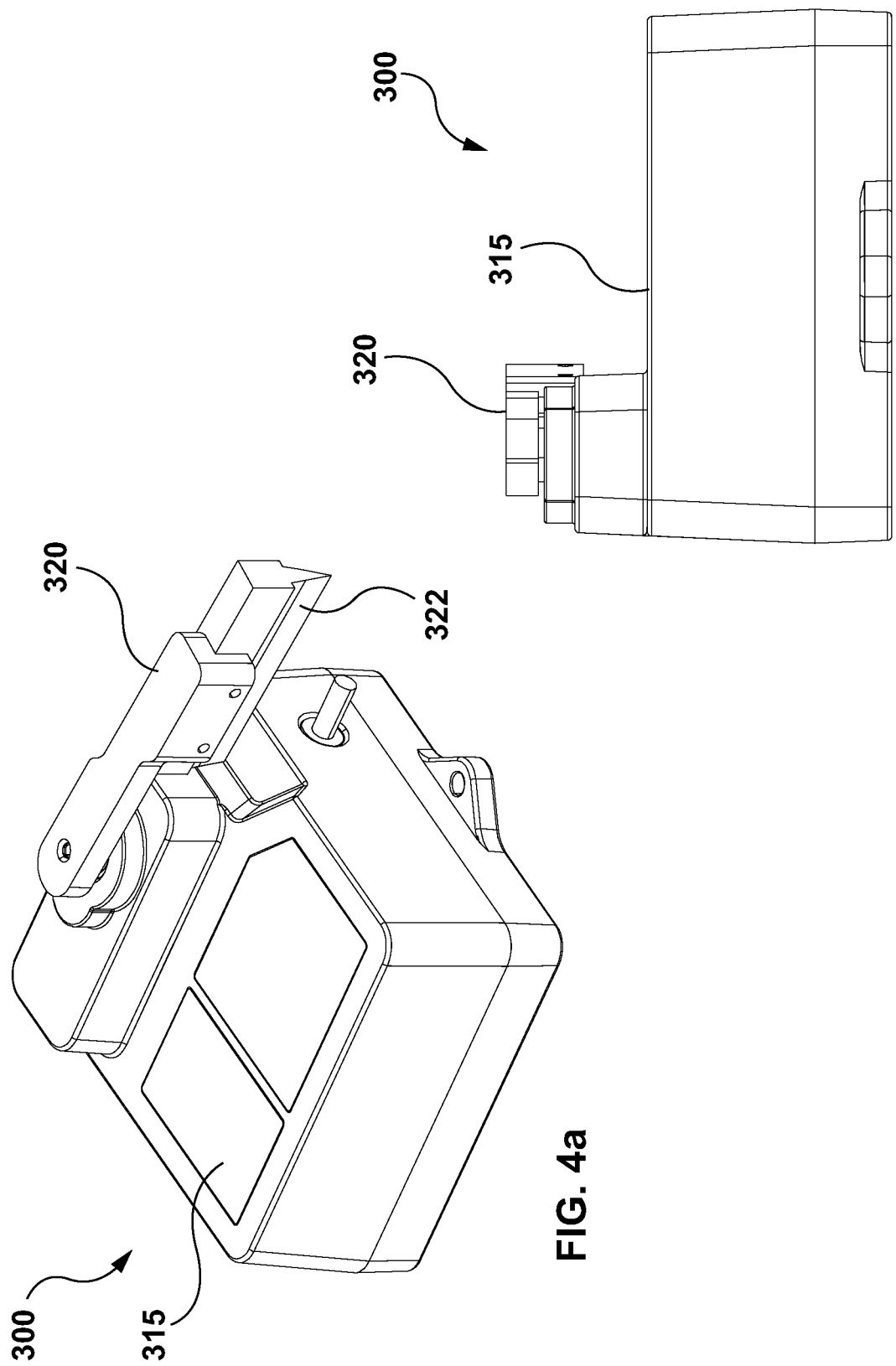

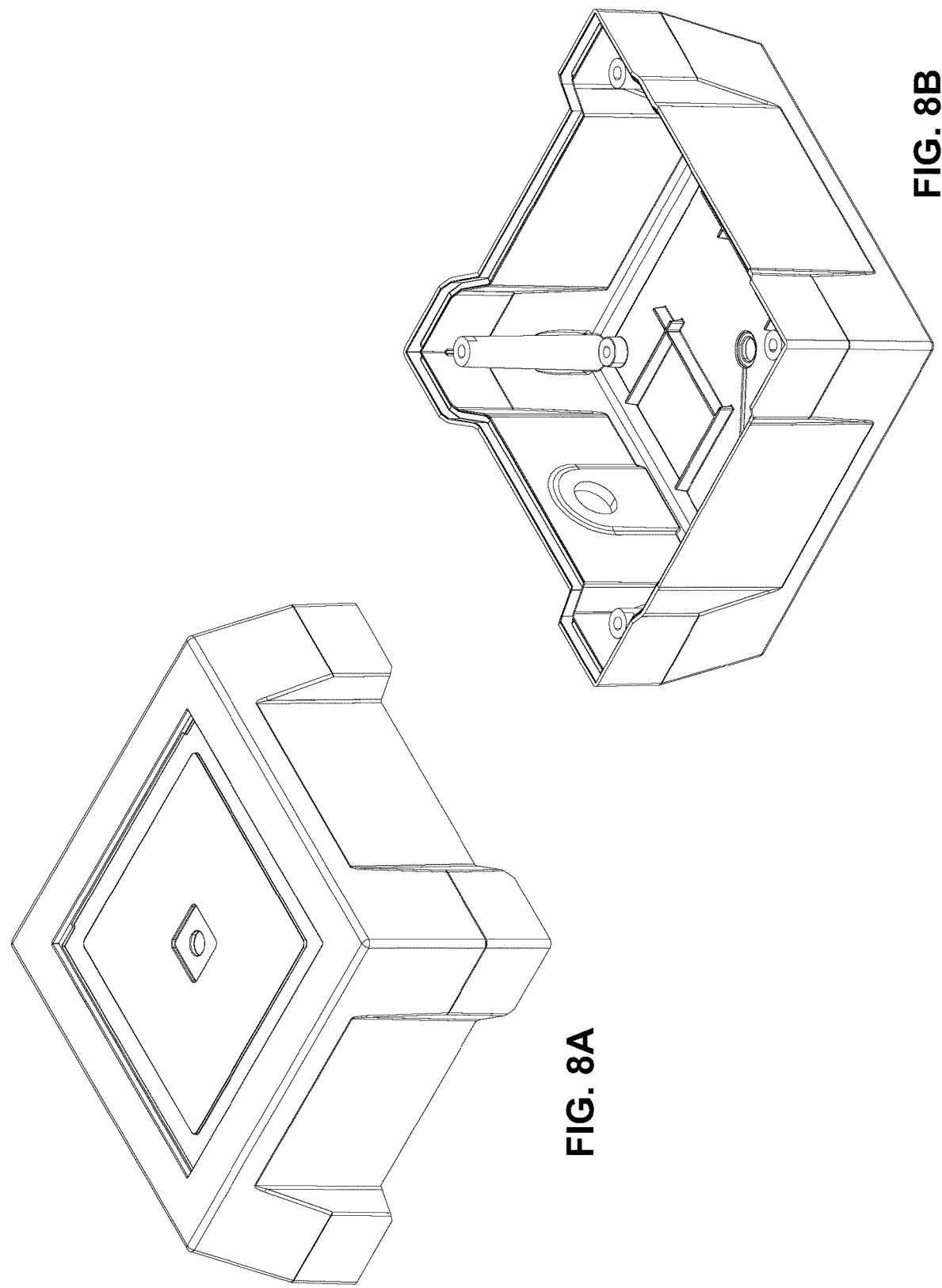

BIN LEVEL MONITORING SYSTEM

CROSS REFERENCE TO RELATED APPLICATIONS

This application is the National Stage Entry under 35 U.S.C. § 371 of Patent Cooperation Treaty Application No. PCT/CA2019/051044, filed 31 Jul. 2019, which claims the benefit of provisional U.S. Application No. 62/770,897, filed 23 Nov. 2018, the contents of which are hereby incorporated by reference herein.

TECHNICAL FIELD

The present disclosure relates generally to agricultural feed bins and more particularly to monitoring systems for such bins.

BACKGROUND

Conventionally, the feed industry relies on farmers to monitor and report their feed levels to a servicing feed mill in order to ensure that the feel mill has adequate lead time to manufacture a farmer's particular blend of feed and to deliver it before the farmer runs out of feed. The monitoring of feed bins is a task requiring constant diligence and therefore low bin levels may often go unnoticed until it is too late and the feed bins are nearly empty. An urgent request by a farmer in desperate need of feed requires a feed mill to reorganize their carefully planned production schedules (putting other diligent farmers at risk of receiving their feed late) and alter their efficiently charted delivery routes to accommodate the farmer who failed to give sufficient notice, thus dashing any hopes of reaching peak efficiency in their complex operations.

A bin level monitoring system for monitoring feed levels inside bins and for reporting these feed levels would thus be highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a bin level monitoring system and related method for measuring a feed level inside a bin.

Accordingly, an inventive aspect of the disclosure is a bin level monitoring system comprising an optical sensor for sensing a feed level inside a feed bin, a circuit board communicatively connected to the sensor for receiving a level signal from the sensor and for processing the level signal to generate bin level data, a battery for powering the circuit board and sensor, an enclosure for enclosing the circuit board and a radio transmitter for transmitting the bin level data. The sensor may be a LIDAR sensor or a time-of-flight (ToF) sensor.

Another inventive aspect of the disclosure is a method of monitoring a bin level, the method comprising optically sensing a feed level inside a feed bin a level signal by optically sensing the feed level, processing the level signal to generate bin level data and transmitting the bin level data.

Other inventive aspects of the disclosure may become apparent to the persons skilled in the art.

BRIEF DESCRIPTION OF THE DRAWINGS

These and other features of the disclosure will become more apparent from the description in which reference is made to the following appended drawings.

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 4a is an isometric view depicting a LIDAR sensor.

FIG. 4b is a rear view depicting the LIDAR sensor of FIG. 4a.

FIG. 4c is a side view depicting the LIDAR sensor of FIG. 4a.

FIG. 4d is a front view depicting the LIDAR sensor of FIG. 4a.

FIG. 4e is a top view depicting the LIDAR sensor of FIG. 4a.

FIG. 4f is a bottom view depicting the LIDAR sensor of FIG. 4a.

FIG. 4g is an isometric cutaway view depicting the LIDAR sensor of FIG. 4a.

FIG. 4h is a top cutaway view depicting the LIDAR sensor of FIG. 4a.

FIG. 8A is a top isometric view of an enclosure for the circuit board.
FIG. 8B is a bottom isometric view of the enclosure of FIG. 8A.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Disclosed herein and illustrated in the figures is a novel bin monitoring system. This novel bin monitoring system provides a novel solution to address a longstanding supply management challenge in the feed industry: the accurate, cost-effective monitoring of product quantity in remotely located feed containers.

Figure 1:
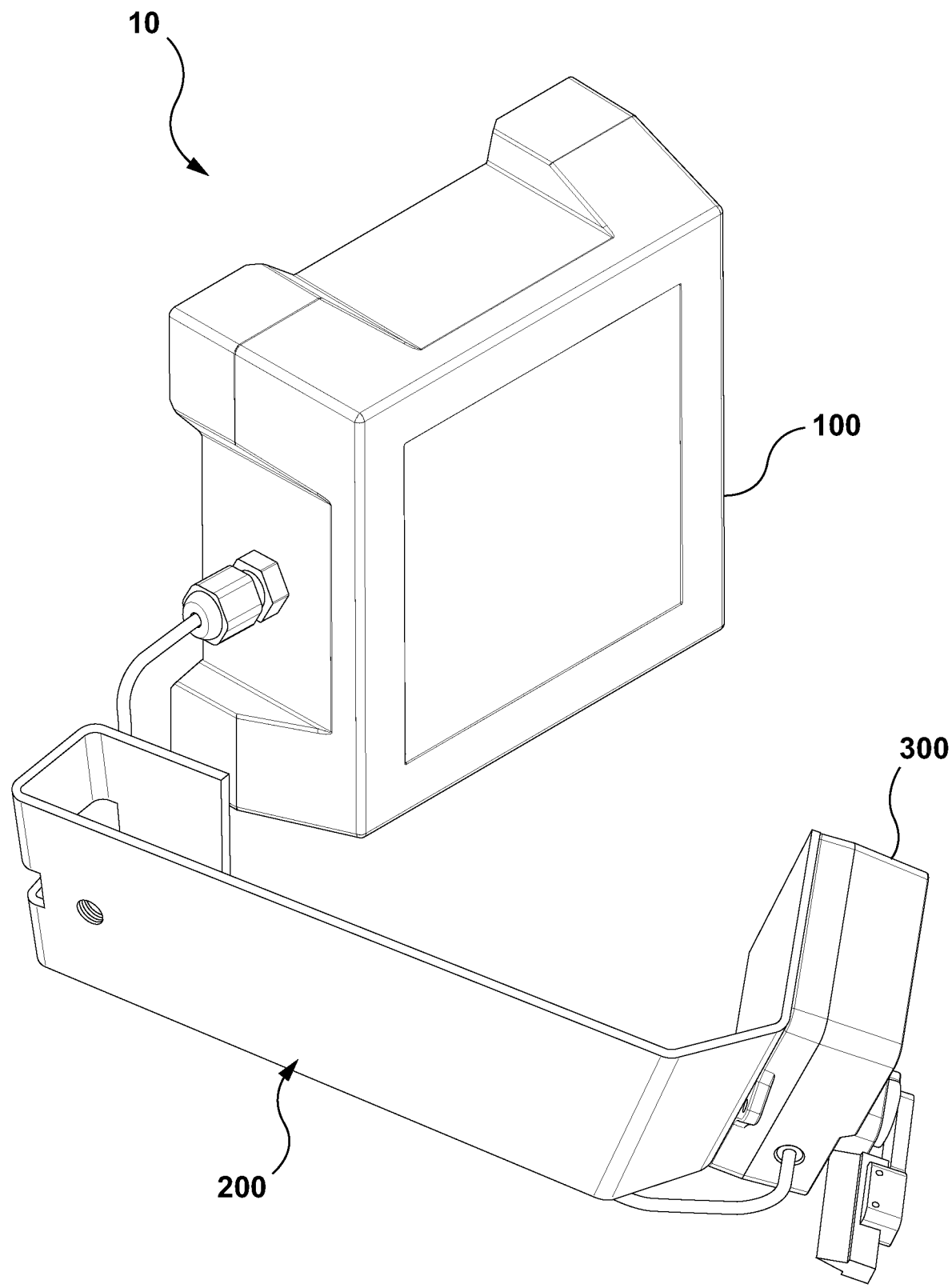
FIG. 1 is an isometric view of a bin level monitoring system in accordance with an embodiment of the present invention.

In the embodiment depicted in FIG. 1, the bin monitoring system 10 comprises a circuit board and enclosure together denoted by reference numeral 100, a sensor-mounting bracket 200 and an optical sensor 300. The optical sensor 300 in one embodiment is a LIDAR sensor. The optical sensor 300 in a second embodiment is a time-of-flight (ToF) machine vision sensor.

Figures 2, 2A:
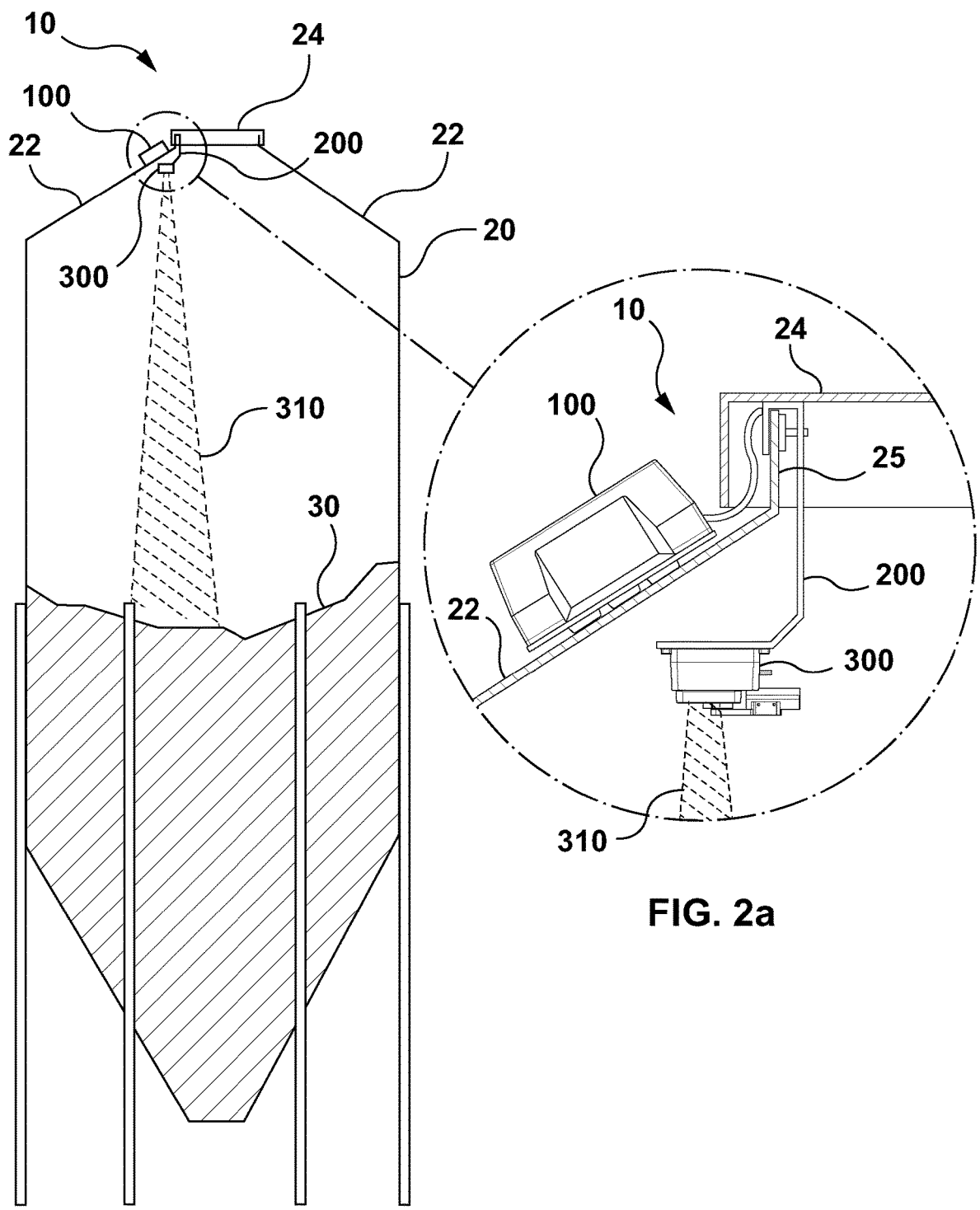
FIG. 2 depicts a bin level monitoring system having a LIDAR sensor.
FIG. 2a is an enlarged view of the LIDAR sensor of FIG. 2.

FIG. 2 depicts a bin level monitoring system 10 in which the sensor 300 is a LIDAR sensor. FIG. 2a is an enlarged view of the LIDAR sensor 300. The LIDAR sensor is suspended by the sensor-mounting bracket 200 inside the bin 20 from the ceiling or roof 22, 24 or any suitable upper structural element such as a beam, truss, frame, etc. FIG. 2 depicts the LIDAR sensor beam 310 that is emitted downwardly to reflect on the feed 30 (or other bulk product) inside the bin 20. In this specific implementation, the circuit board and enclosure 100 are mounted to a sloped portion 22 of the roof whereas the sensor-mounting bracket 200 is connected to an upright structural element 25 beneath a flat portion 24 of the roof. It will be appreciated that the sensor-mounting bracket may be modified to have a different geometry to be mounted to another element of the bin while positioning the sensor to aim downwardly.

Figures 3, 3A, 3B, 3C:
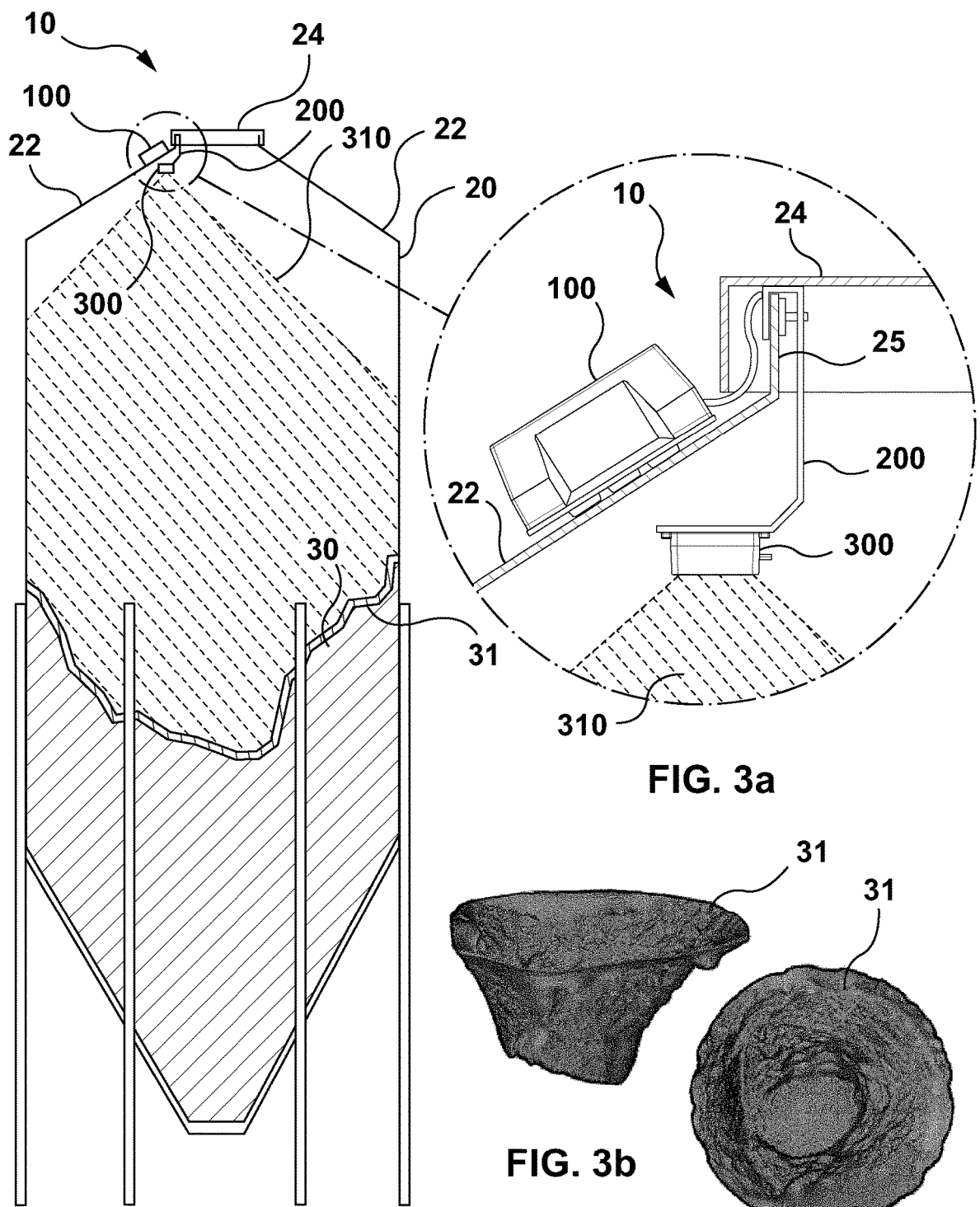
FIG. 3 depicts a bin level monitoring system having a time-of-flight (ToF) sensor.
FIG. 3a is an enlarged view of the ToF sensor of FIG. 3.
FIG. 3b depicts a surface point map, from a first side perspective, defining the topology of the top surface of the feed in the bin.
FIG. 3c depicts another surface point map, from a second upper perspective, defining the topology of the top surface of the feed in the bin.
Figure 4D:
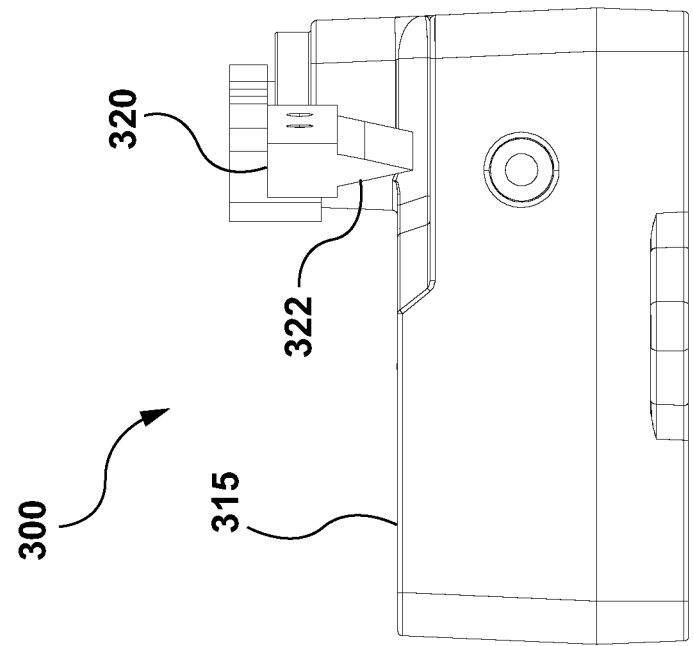
Figure 4C:
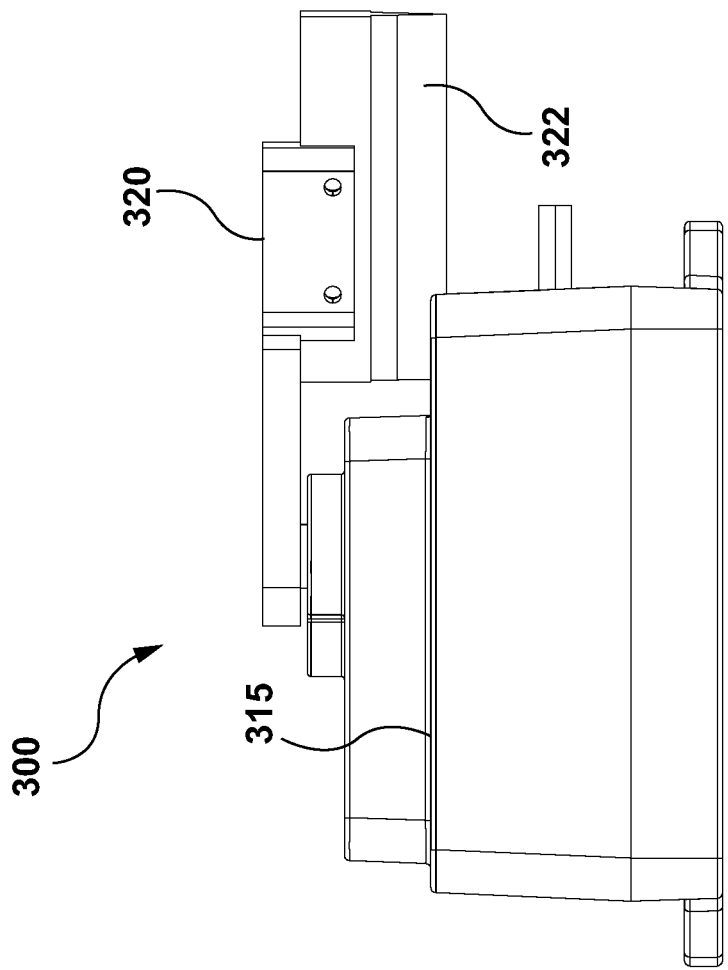
Figure 4E:
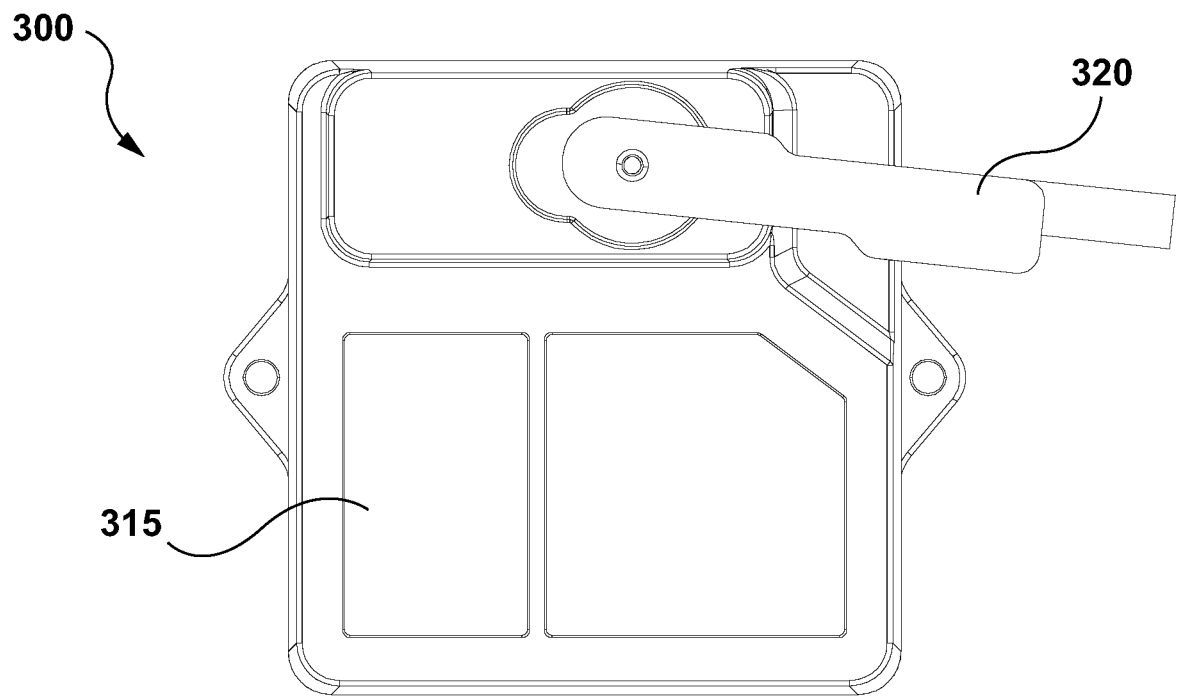
Figure 4F:
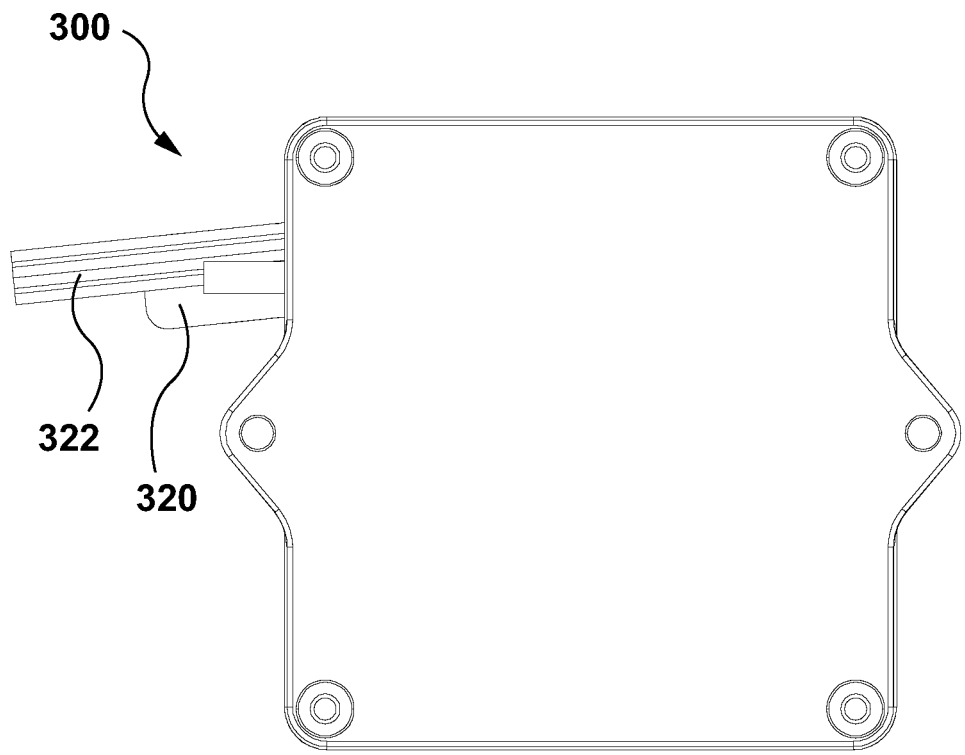
Figures 4G, 4H:
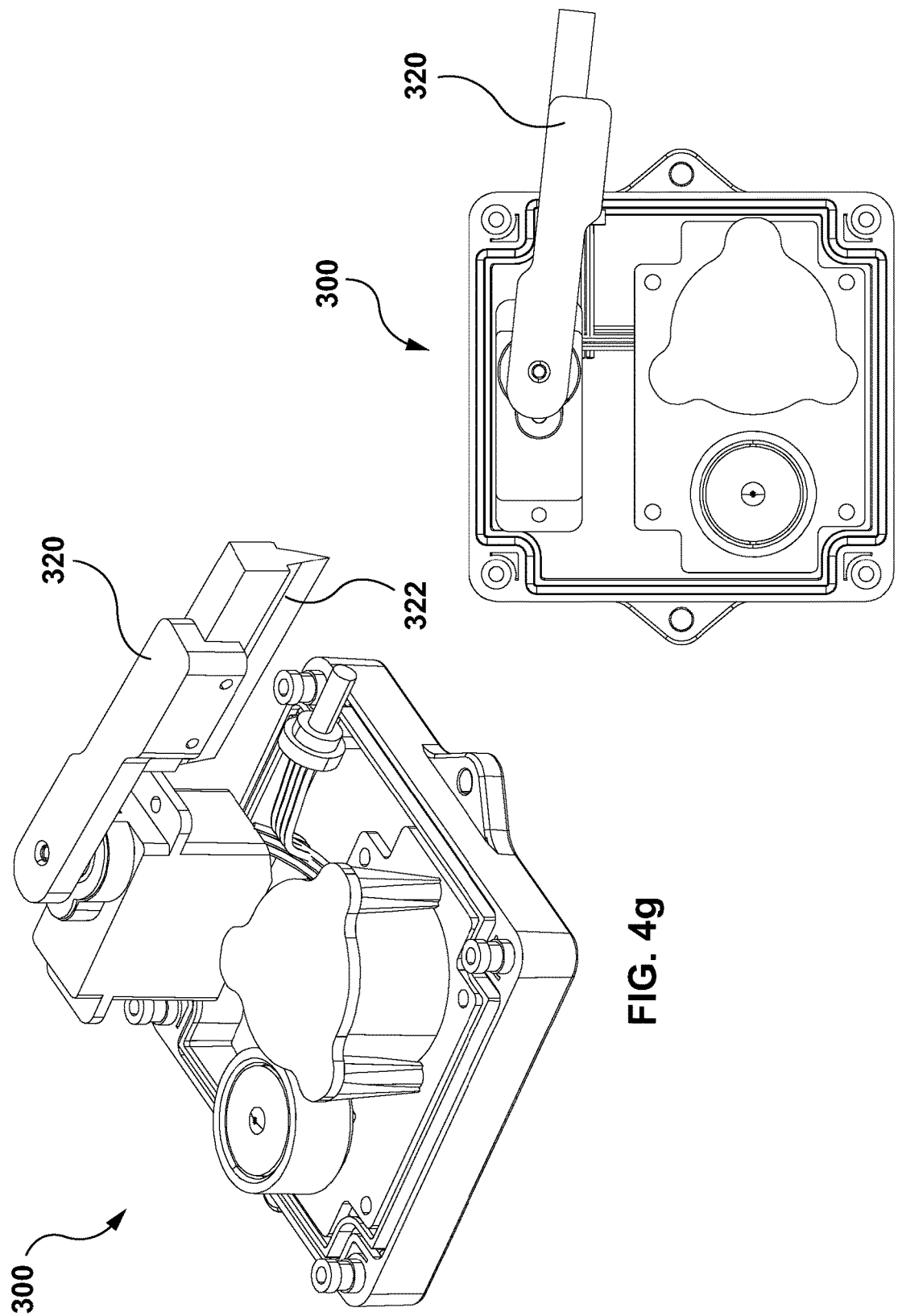
Figure 5B:
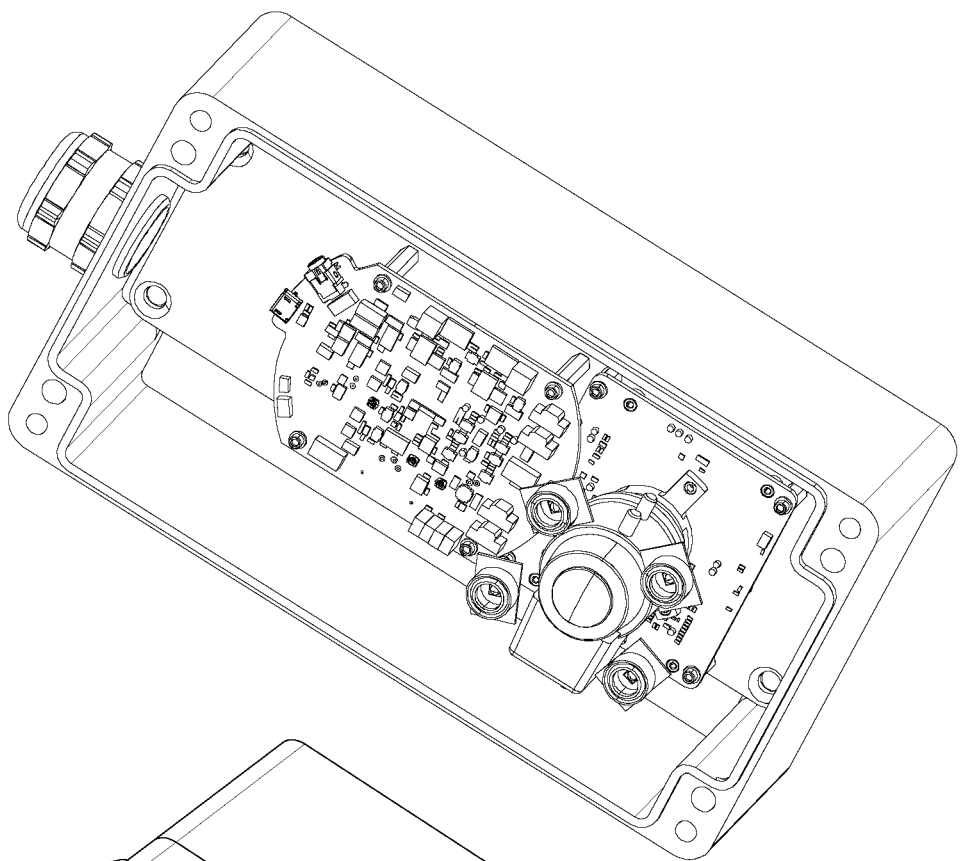
FIG. 5B is an isometric cutaway view depicting the ToF sensor of FIG. 5A.
Figure 5A:
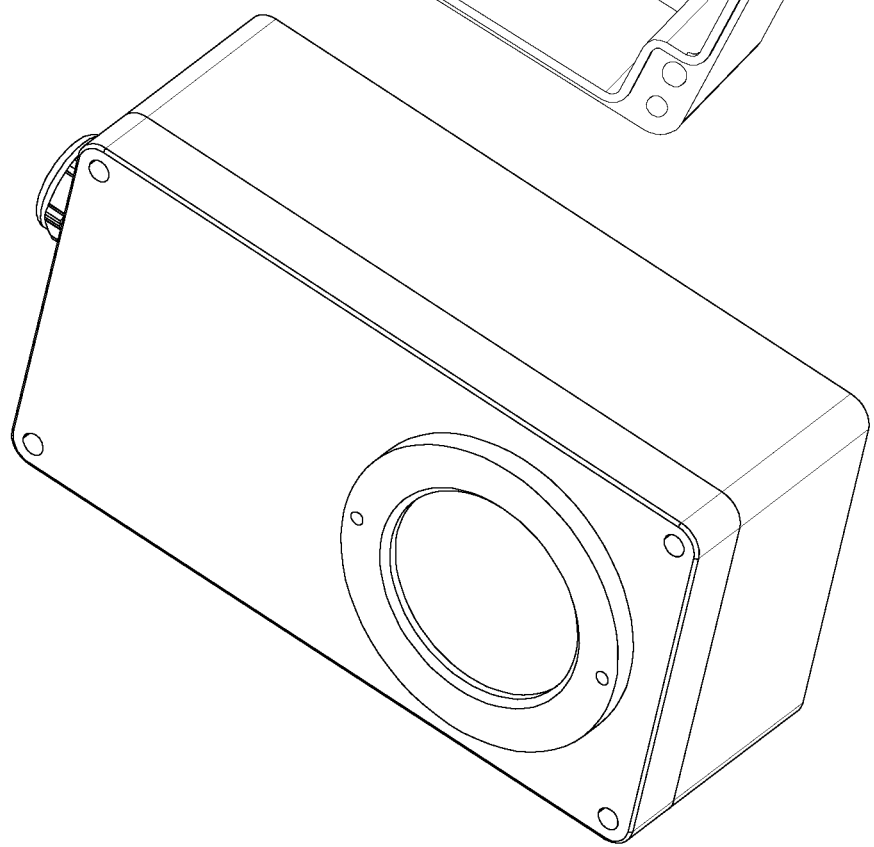
FIG. 5A is an isometric view depicting a time-of-flight (ToF) sensor.
Figure 5E:
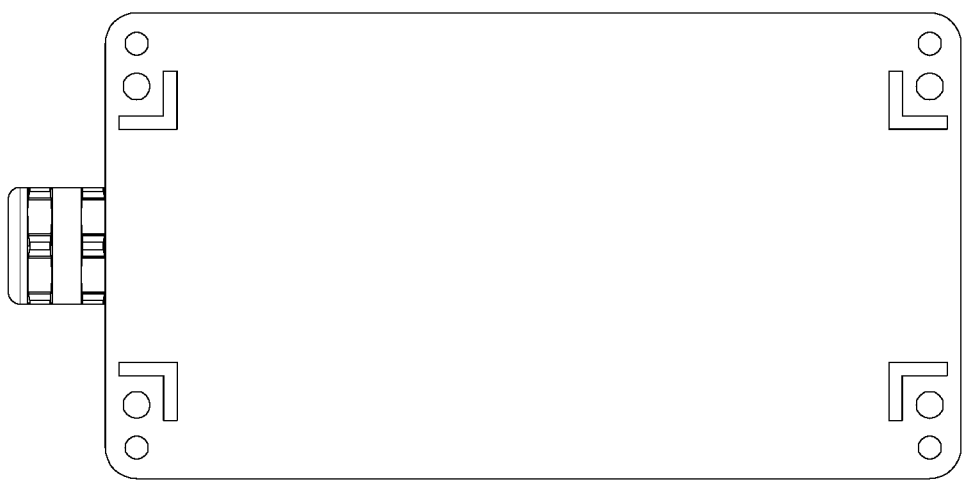
FIG. 5E is a rear view depicting the ToF sensor of FIG. 5A.
Figure 5D:
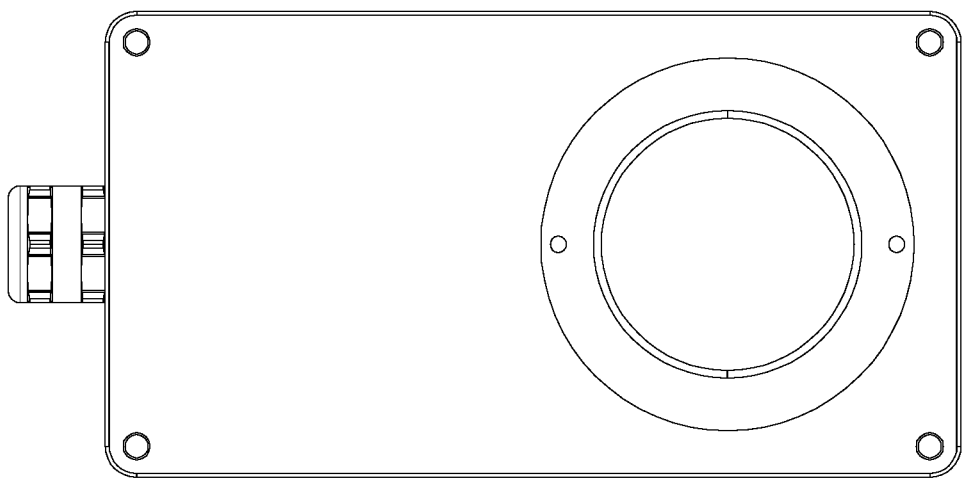
FIG. 5D is a front view depicting the ToF sensor of FIG. 5A.
Figure 5C:
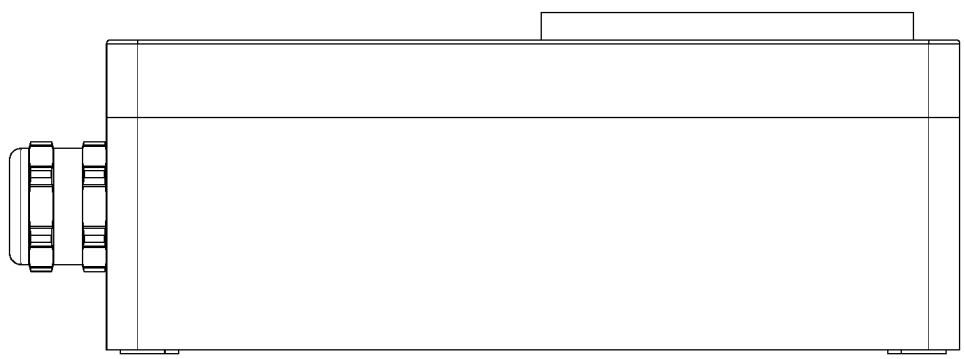
FIG. 5C is a side view depicting the ToF sensor of FIG. 5A.
Figure 5G:
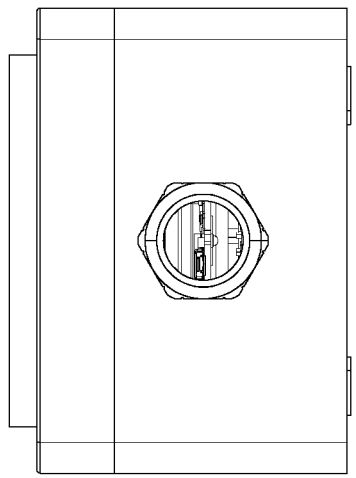
FIG. 5G is a top view depicting the ToF sensor of FIG. 5A.
Figure 5F:
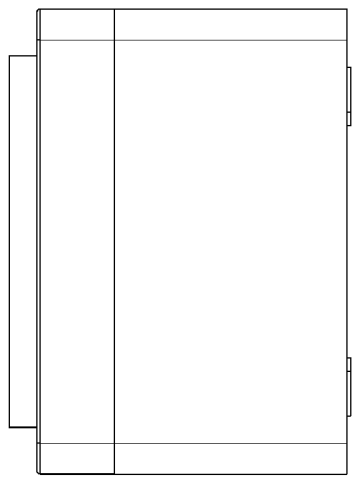
FIG. 5F is a bottom view depicting the ToF sensor of FIG. 5A.
Figure 5I:
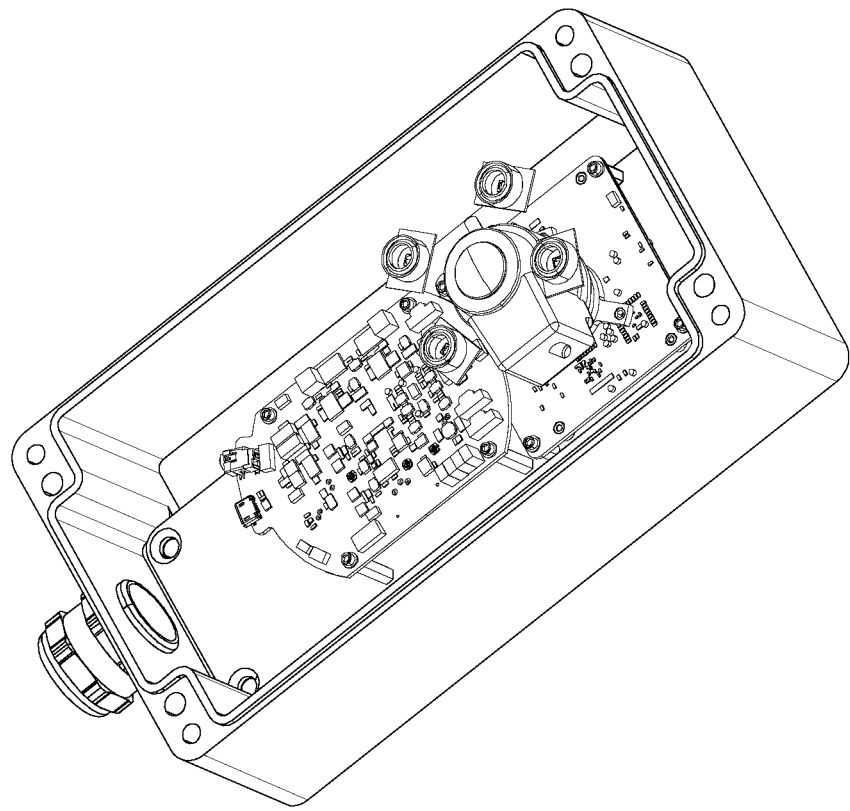
FIG. 5I is another isometric view depicting the ToF sensor of FIG. 5A.
Figure 5H:
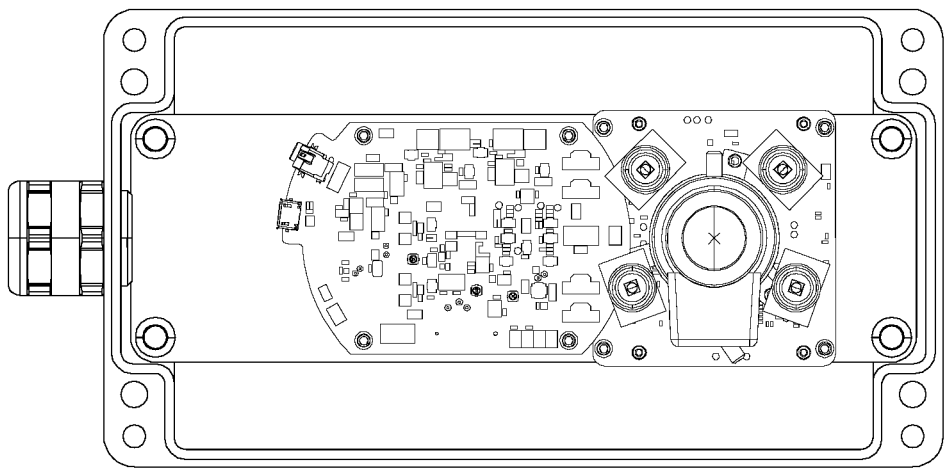
FIG. 5H is a front cutaway view depicting the ToF sensor of FIG. 5A.
Figure 6A:
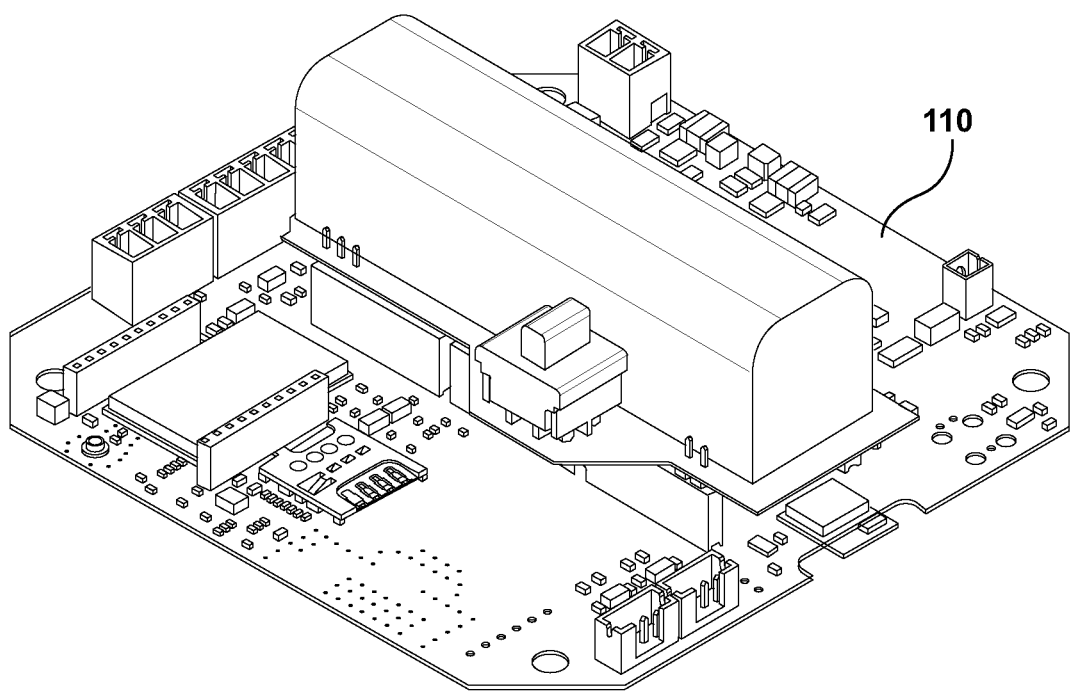
FIG. 6A is an isometric view depicting a circuit board.
Figure 6C:
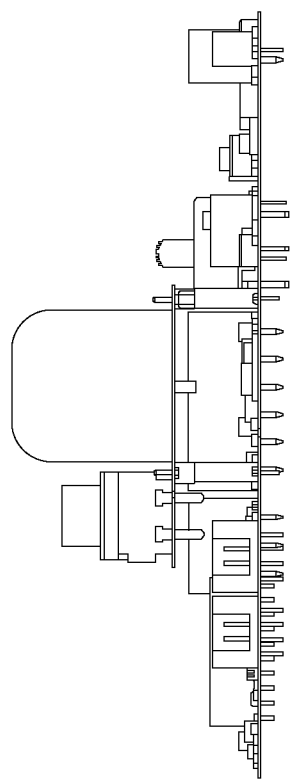
FIG. 6C is a side view of the circuit board of FIG. 6A.
Figure 6B:
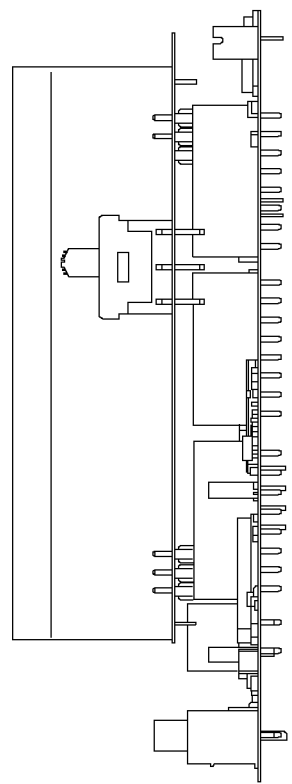
FIG. 6B is a front view of the circuit board of FIG. 6A.
Figure 6D:
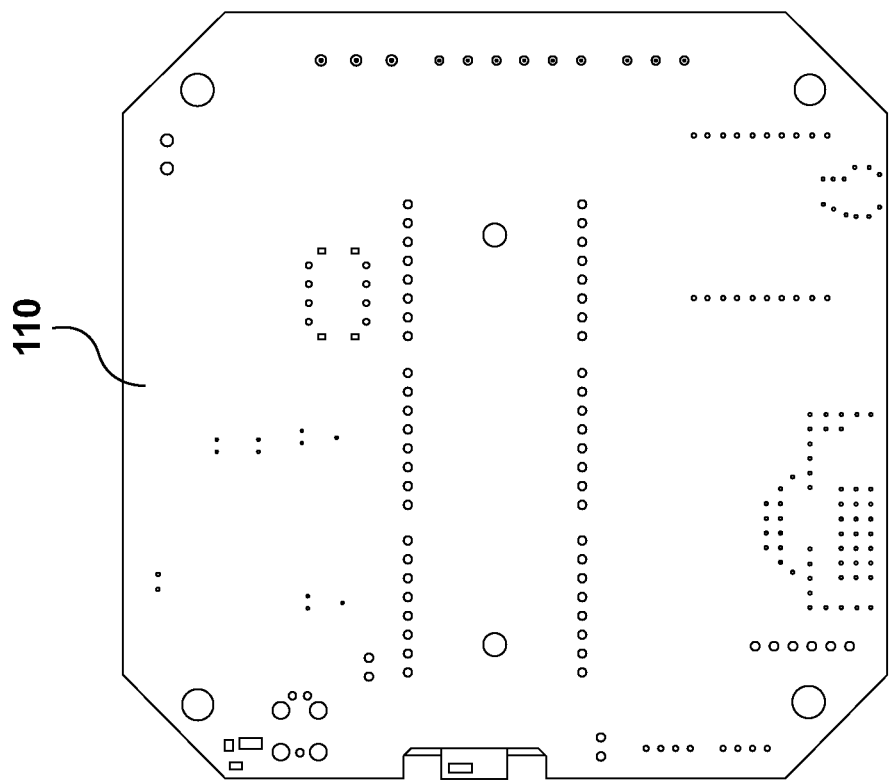
FIG. 6D is a top view of the circuit board of FIG. 6A.
Figure 6E:
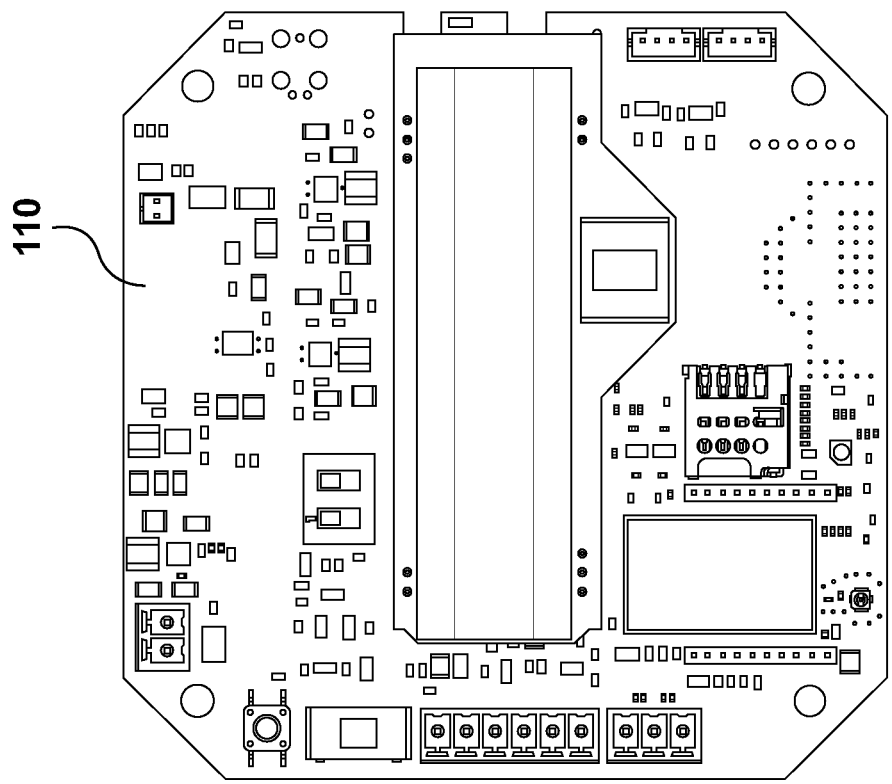
FIG. 6E is a bottom view of the circuit board of FIG. 6A.
Figure 7:
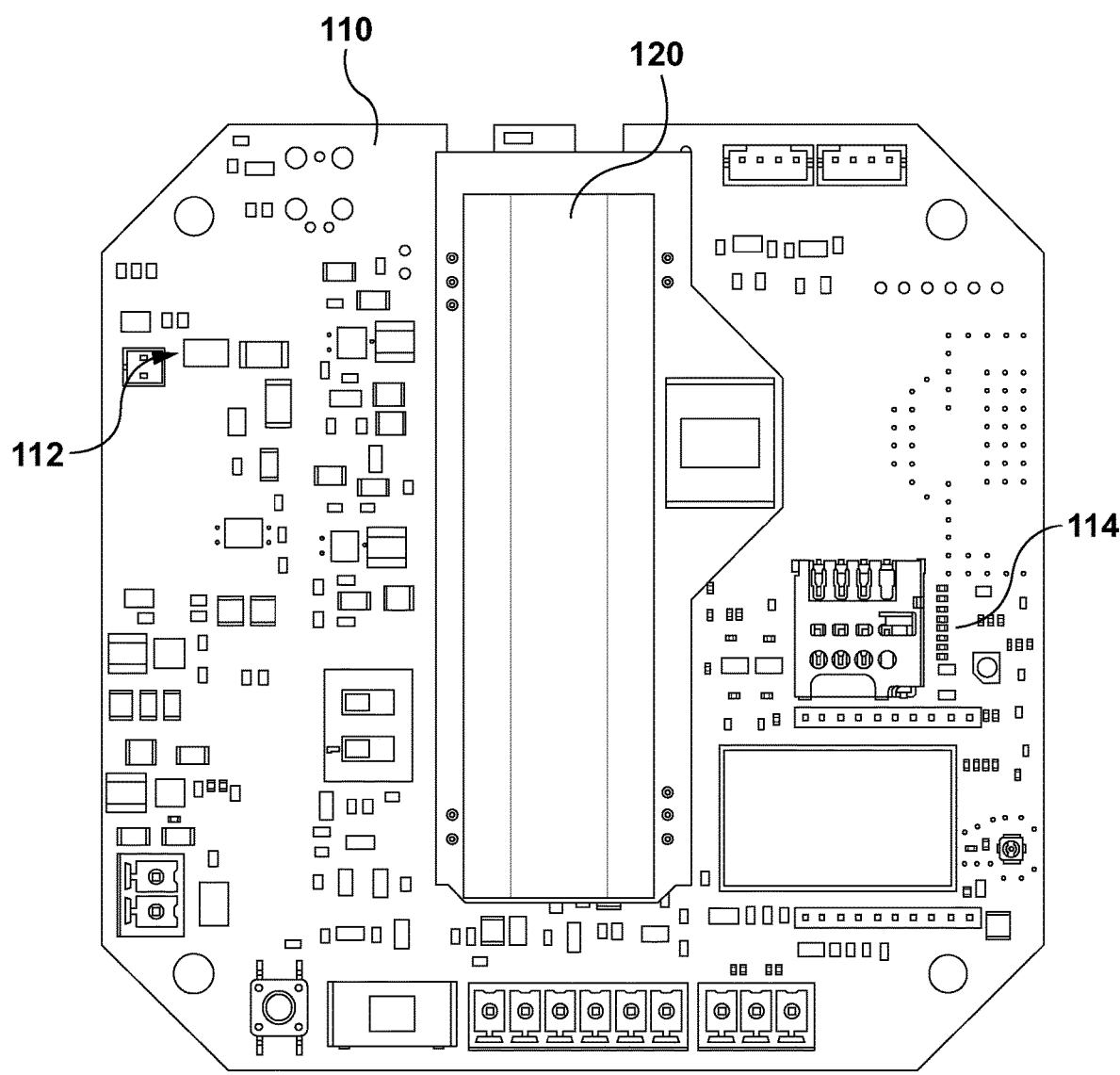
FIG. 7 is an enlarged plan view of the circuit board of FIG. 6A.

FIG. 3 depicts another embodiment of the bin level monitoring system in which the sensor 300 is a time-of-flight (ToF) sensor. FIG. 3a is an enlarged view of the ToF sensor 300. As in the first embodiment, the sensor 300 is suspended to aim downwardly inside the bin 20. The ToF machine vision sensor captures images or three-dimensional surface point maps of the shape of the feed 30 inside the bin 20. The surface point map defines the topology 31 of the top surface of the feed as shown by way of example in FIG. 3b and FIG. 3c. This provides a far more accurate estimation of the amount of feed inside the bin. As further illustrated in FIGS. 3b and 3c, the three-dimensional surface map 31 is constituted of a very large number of individual depth results (points) that very closely approximate the contours and shape of the feed 30 in the bin 20.

FIGS. 4A-4H depict a LIDAR sensor 300. The LIDAR sensor has one or more quartz glass lenses 315 and a self-cleaning wiper 320. The wiper has a wiper arm and an elastomeric wiper blade 322 to clean the one or more lenses 315. The wiper may be rotated by a servo or other type of electric motor. A controller may be provided to periodically trigger the servo to rotate the wiper to clean the one or more lenses. The controller may be programmed or configured to operate automatically. Alternatively, the controller may be reprogrammable or reconfigurable by the user. In a further variant, the controller may be configured to receive a control signal to wipe the one or more lenses. The control signal may be received from the circuit board in response to detecting that the LIDAR sensor is not working properly and requires cleaning.

FIGS. 5A-5I depict a time-of-flight (ToF) machine vision sensor 300. FIG. 5 shows the sensor components which include an illumination unit and optics that focus the reflected light onto the image sensor (focal plane array). In the image sensor, each pixel measures the time the light has taken to travel from the illumination unit to the point on the feed and back to the focal plane array. The sensor includes driver electronics to control and synchronize both the illumination unit and the image sensor.

FIGS. 6A-6E and FIG. 7 depict a circuit board 110 which is part of the board/enclosure assembly 100. The circuit board may be a printed circuit board (PCB) as shown having a maximum power point tracking (MPPT) integrated circuit 112, a SIM (subscriber identity module) card slot 114 for receiving a SIM card for the RF cellular transceiver, and a battery board 120 for receiving a battery. The circuit board may also have the following additional components: a solar charge connector, UART (universal asynchronous receiver/transmitter) headers, I/O headers, XBee® modem expansion headers, grove connectors, and a Bluetooth® module. Other components may be present. Likewise, not all embodiments have all of these components. The layout of the electronics on the circuit board is merely one example and it will be appreciated that the electronics may be disposed on the circuit board in any other suitable layout.

Figure 8D:
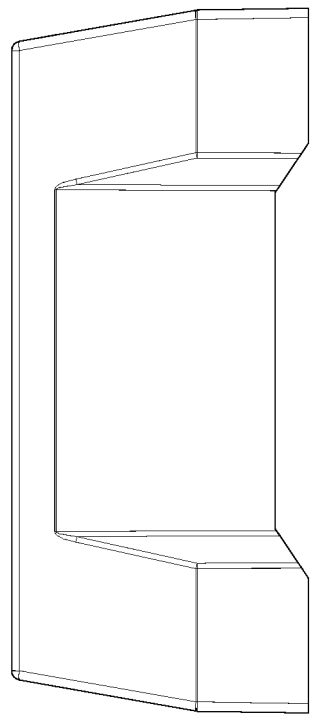
FIG. 8D is a side view of the enclosure of FIG. 8A.
Figure 8C:
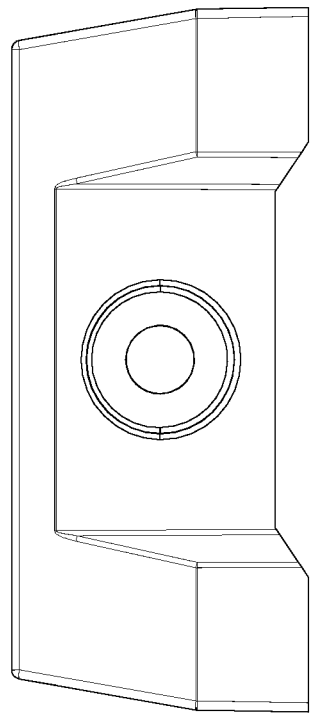
FIG. 8C is a front view of the enclosure of FIG. 8A.
Figure 8E:
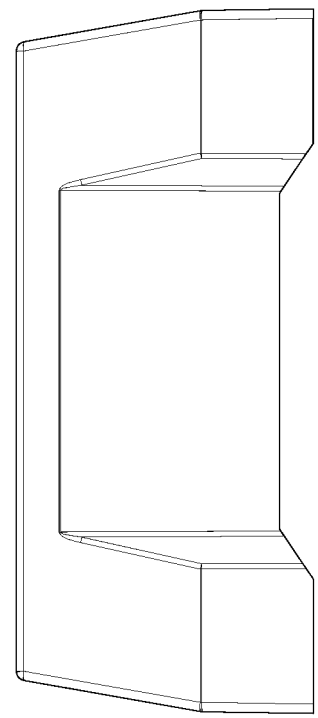
FIG. 8E is a rear view of the enclosure of FIG. 8A.
Figure 8G:
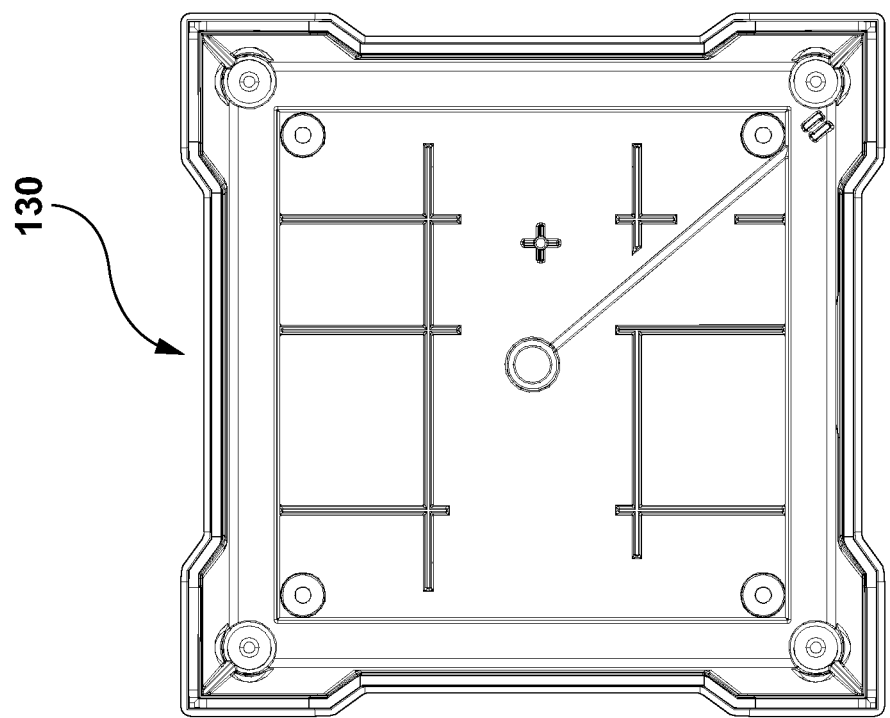
FIG. 8G is a bottom view of the enclosure of FIG. 8A.
Figure 8F:
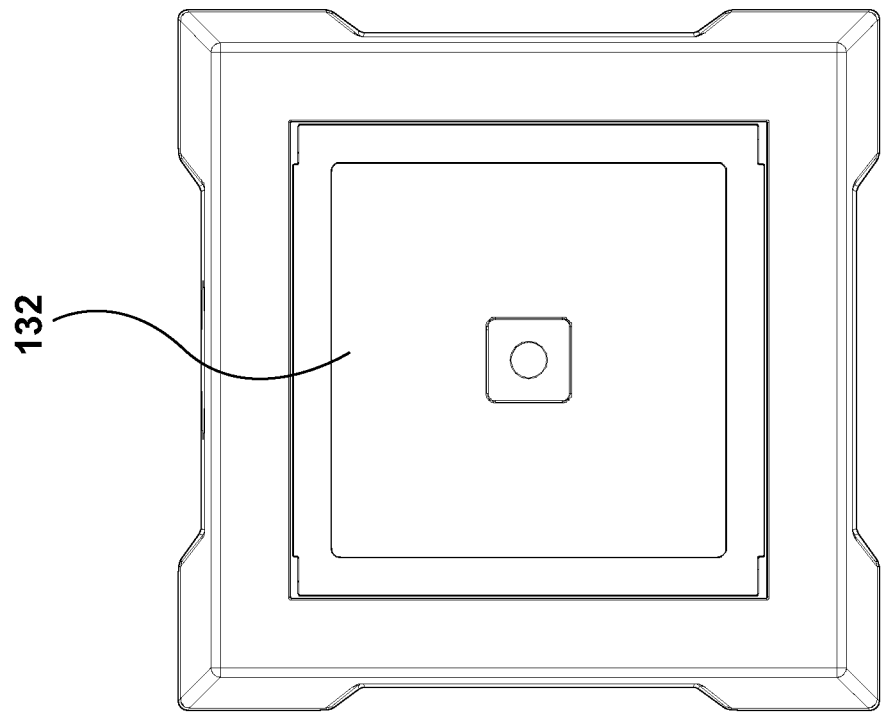
FIG. 8F is a top view of the enclosure of FIG. 8A.
Figure 8H:
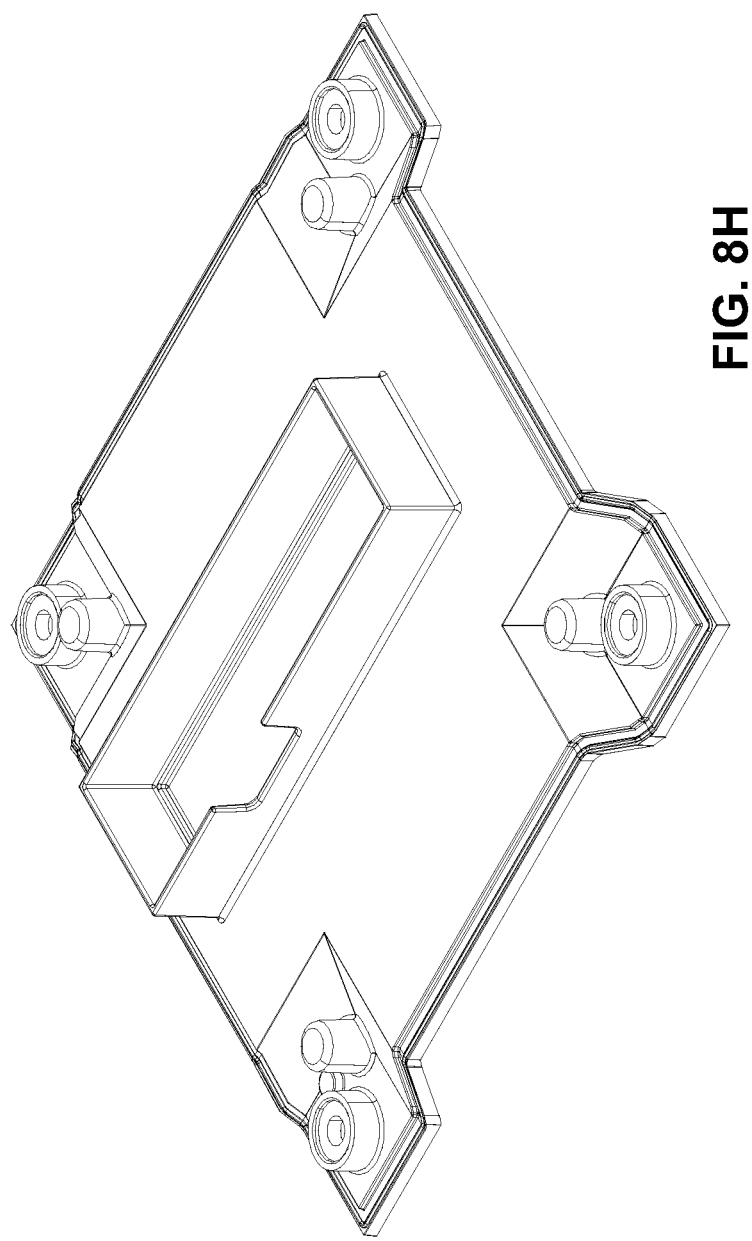
FIG. 8H is an isometric view of a base for the enclosure of FIG. 8A.
Figure 8I:
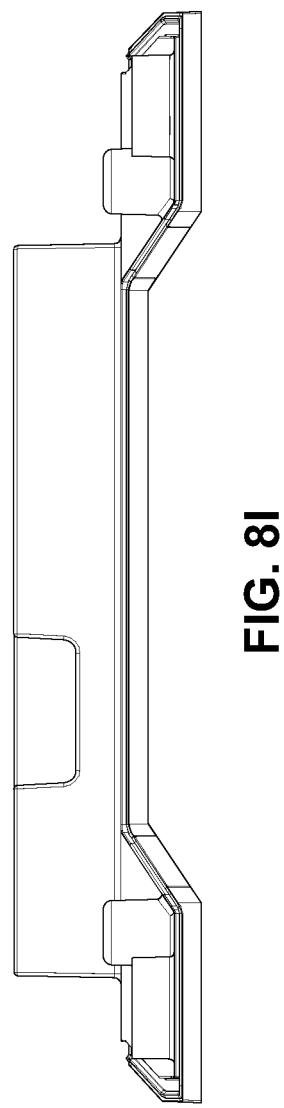
FIG. 8I is a front view of the base of FIG. 8H.
Figure 8J:
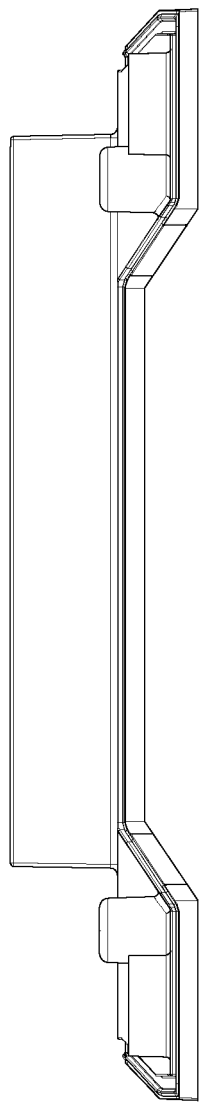
FIG. 8J is a rear view of the base of FIG. 8H.
Figure 8K:
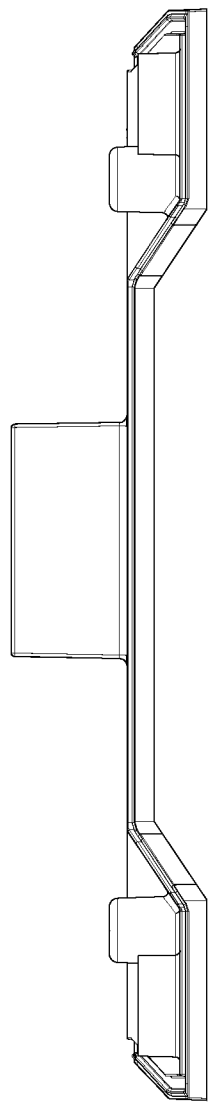
FIG. 8K is a side view of the base of FIG. 8H.
Figure 8M:
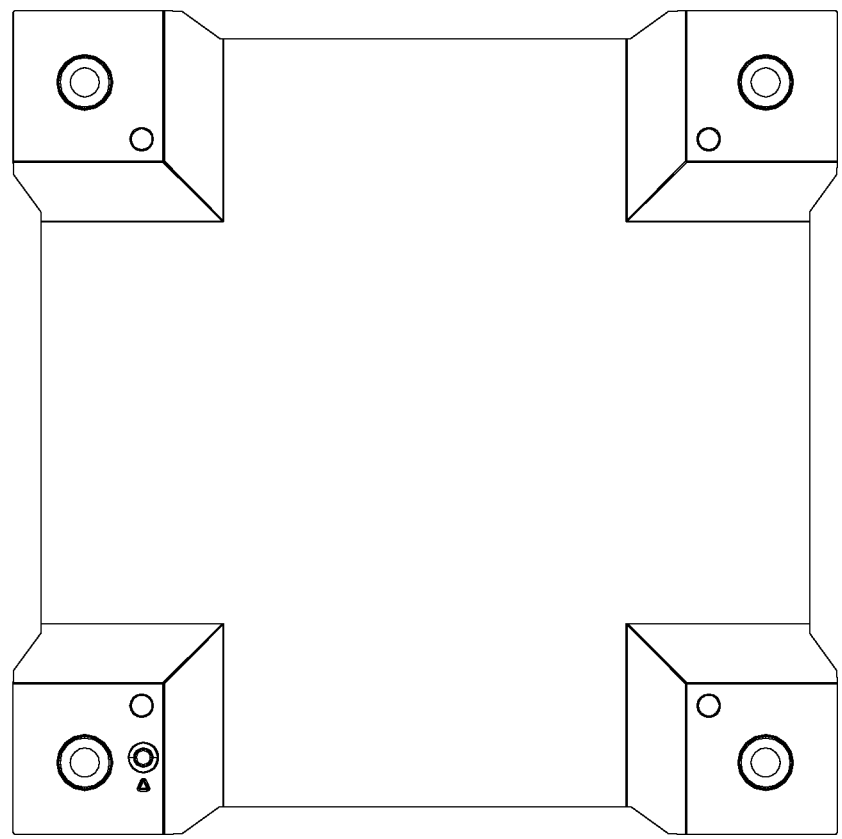
FIG. 8M is a bottom view of the base of FIG. 8H.
Figure 8L:
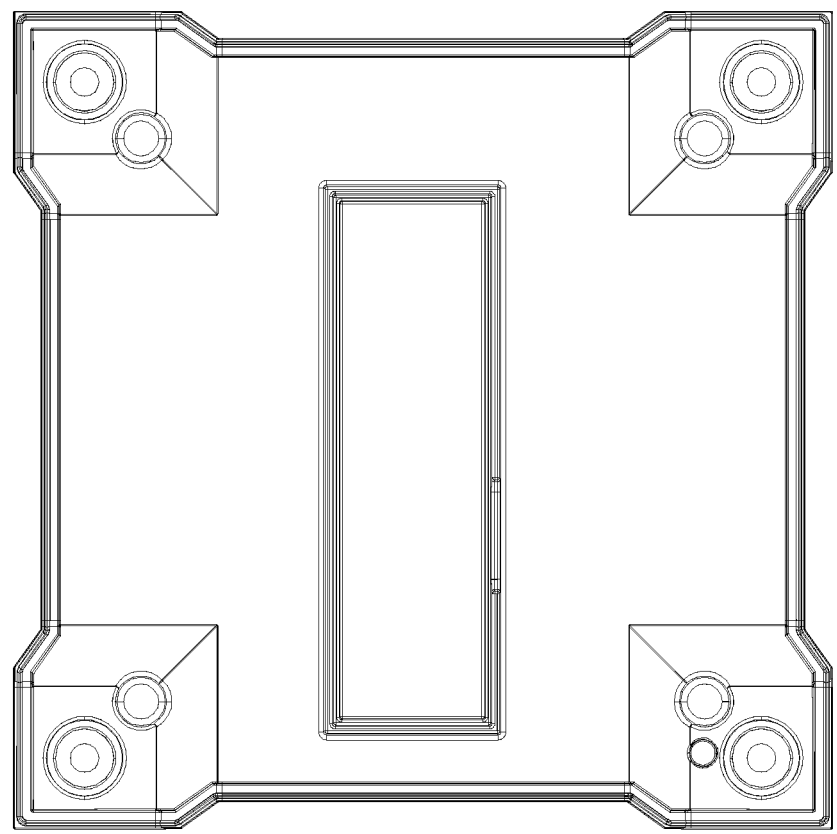
FIG. 8L is a top view of the base of FIG. 8H.
Figure 8N:
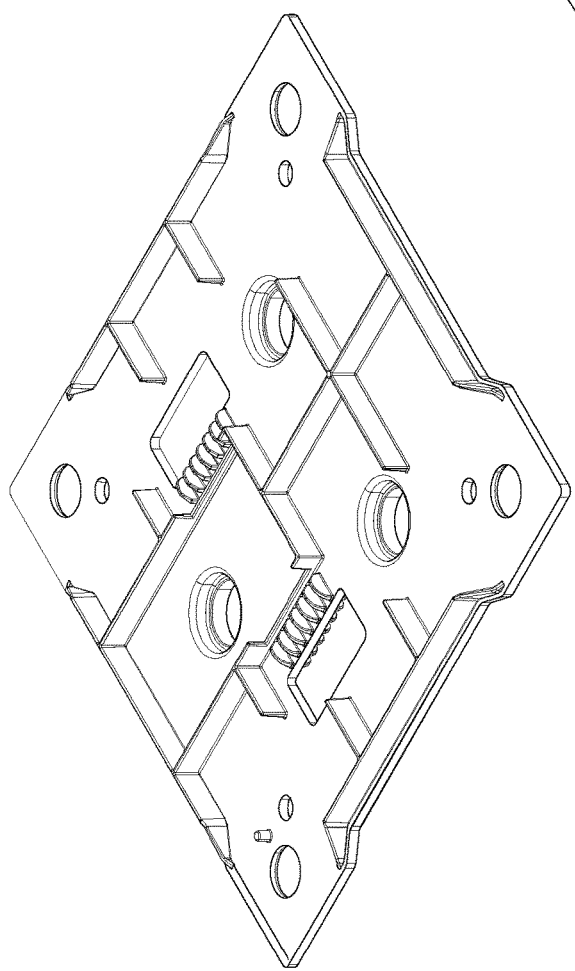
FIG. 8N is a top isometric view of another base plate for use with the enclosure.
Figure 8O:
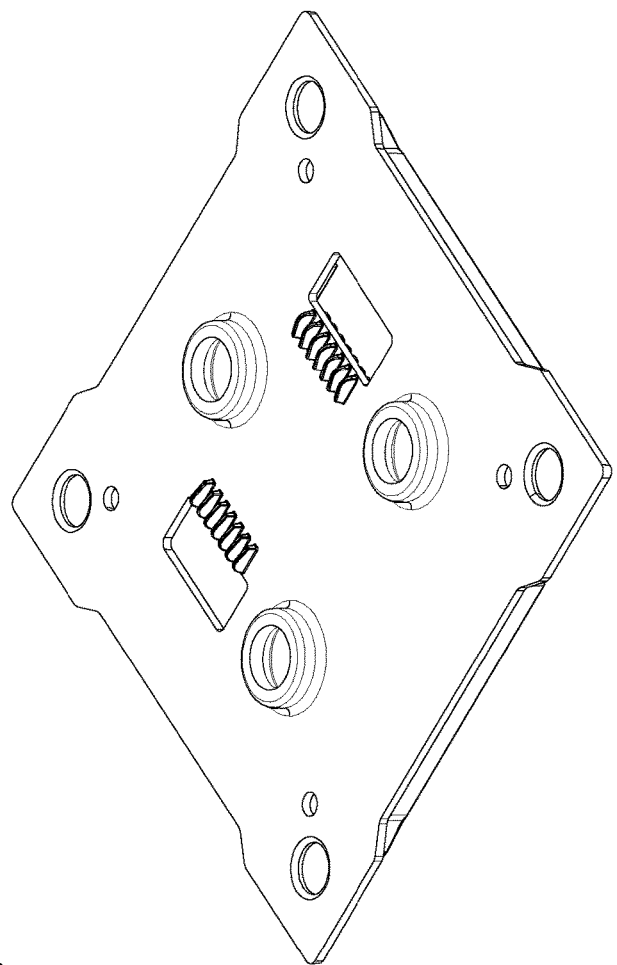
FIG. 8O is a bottom isometric view of the base plate of FIG. 8N.
Figure 8P:
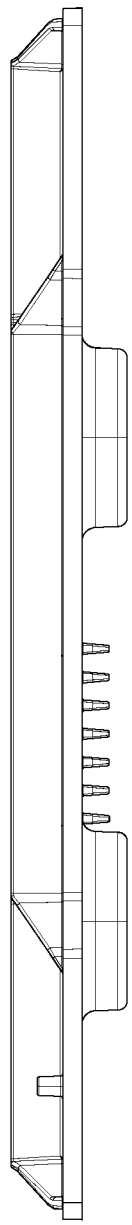
FIG. 8P is a first side view of the base plate of FIG. 8N.
Figure 8Q:
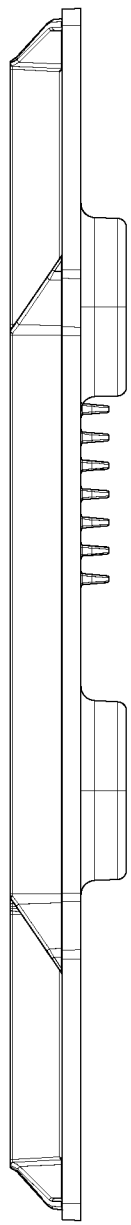
FIG. 8Q is a second side view of the base plate of FIG. 8N.
Figure 8R:
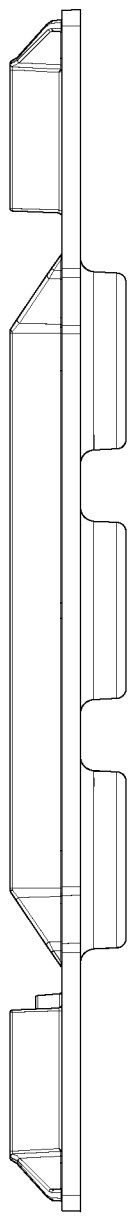
FIG. 8R is a front view of the base plate of FIG. 8N.
Figure 8T:
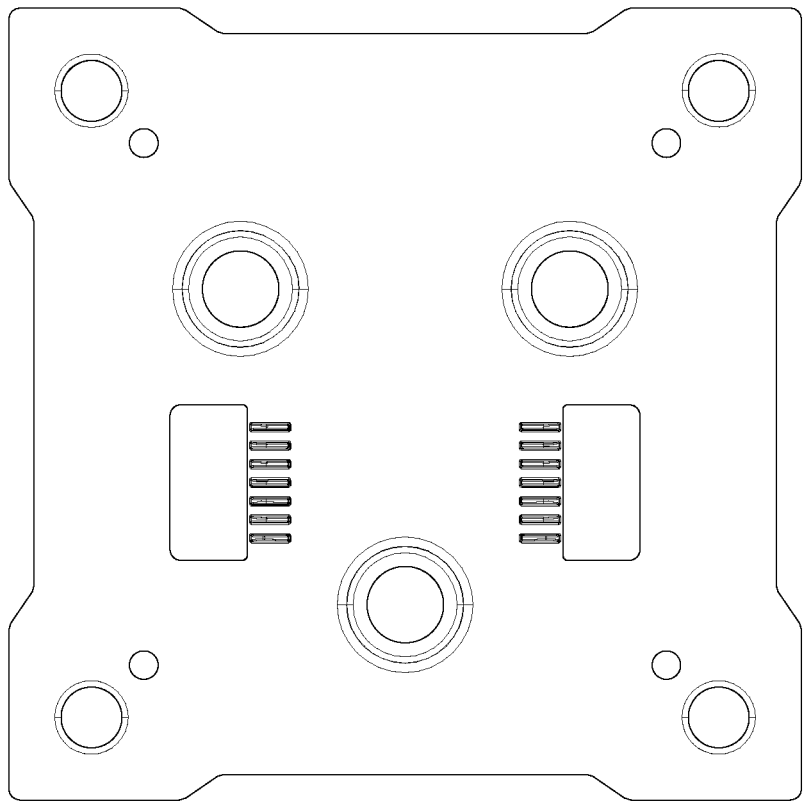
FIG. 8T is a bottom view of the base plate of FIG. 8N.
Figure 8S:
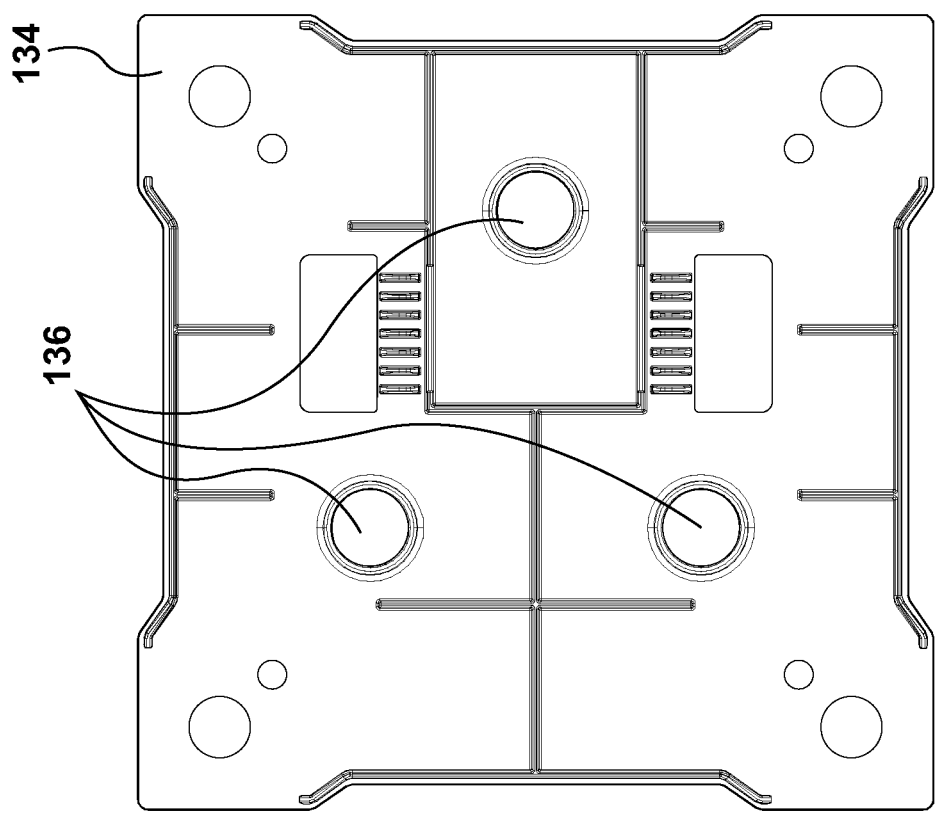
FIG. 8S is a top view of the base plate of FIG. 8N.
Figures 9A, 9B:
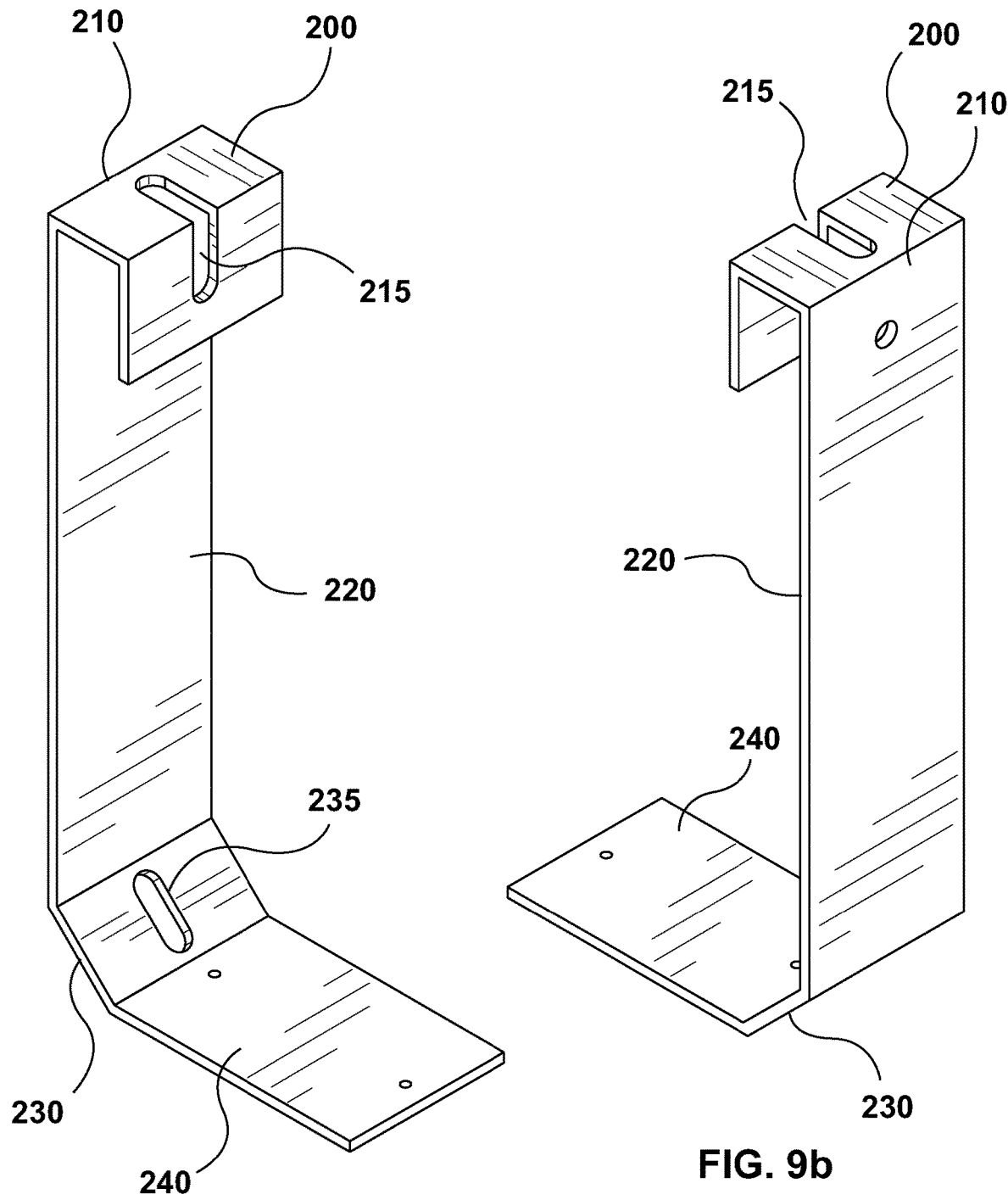
FIG. 9A is an isometric view of a sensor-mounting bracket.
FIG. 9B is another isometric view of the sensor-mounting bracket.
Figure 9C:
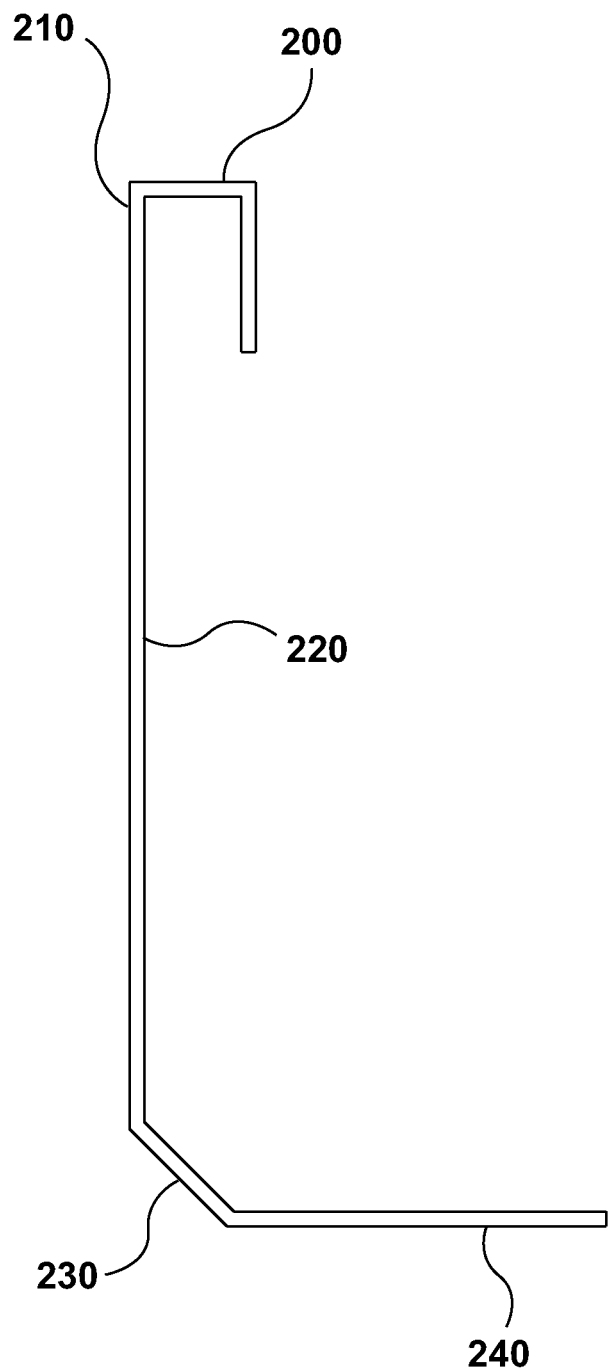
FIG. 9C is a right side view of the sensor-mounting bracket.
Figure 9D:
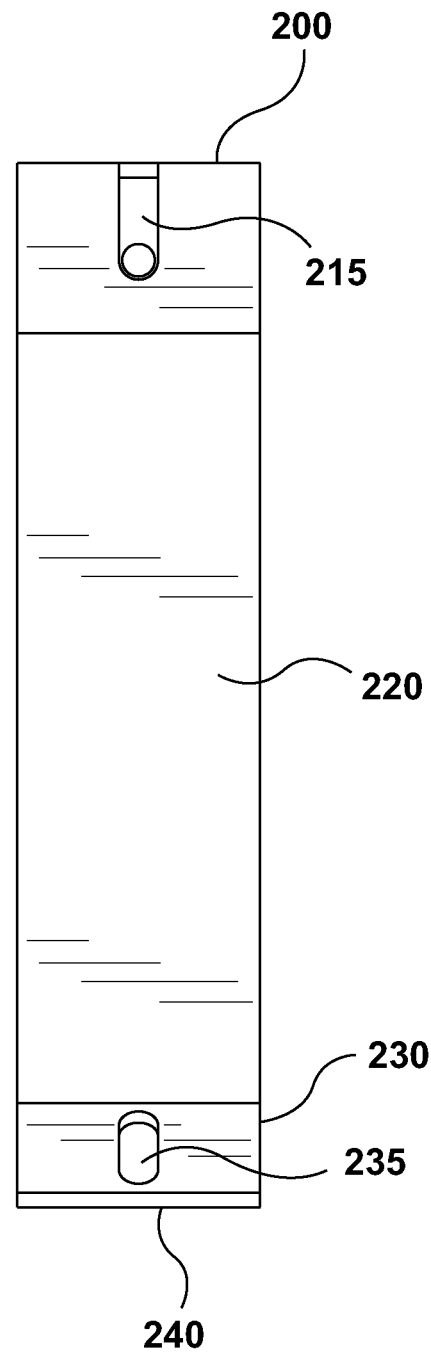
FIG. 9D is a front view of the sensor-mounting bracket.
Figures 9E, 9F:
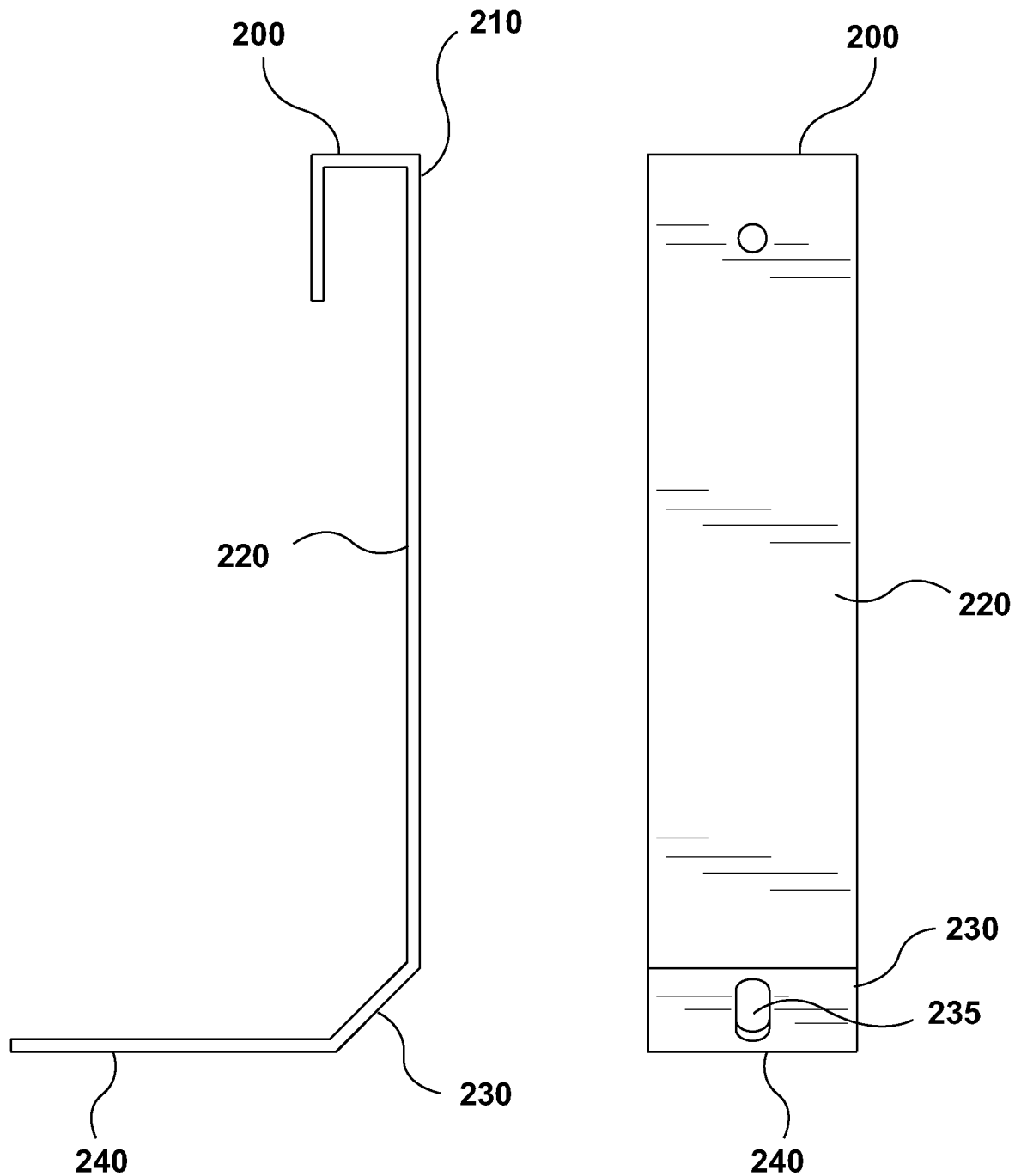
FIG. 9E is a left side view of the sensor-mounting bracket.
FIG. 9F is a rear view of the sensor-mounting bracket.
Figure 9G:
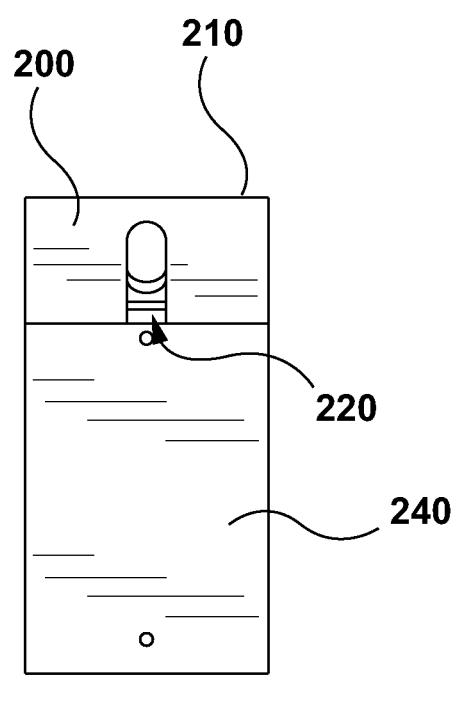
FIG. 9G is a top view of the sensor-mounting bracket.
Figure 9H:
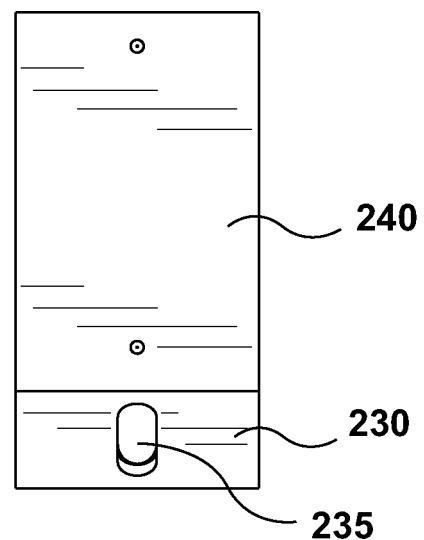
FIG. 9H is a bottom view of the sensor-mounting bracket.

FIG. 8A-8T depict an enclosure 130 for the circuit board 110. The enclosure 130 has an upper cover 132 and a base or mounting plate 134. The mounting plate has sockets 136 for magnets. In the specific embodiment shown in FIG. 8A-8T, the mounting plate has three sockets for magnets for securing the enclosure to a roof of the bin. The magnets may be rare-earth magnets in one specific embodiment. Although the enclosure is shown as generally square with a flat upper surface, it will be appreciated that the shape of the enclosure may be varied in other embodiments, for example to cover a differently shaped circuit board.

FIGS. 9A-9H depict a sensor-mounting bracket 200. The bracket 200 in this illustrated example has an upper U-shaped hanger portion 210 with an oblong hole 215, a vertical portion 220, an angled portion 230 with another oblong hole 235 and a horizontal portion 240. This particular geometry enables mounting to a vertical element and positioning of the sensor to aim downwardly toward the feed in the bottom of the bin. The bracket may have other geometries to accommodate different bin roof structures and/or different types of sensor mounts. The dimensions are clearly merely as only an example. It will be appreciated that the dimensions or proportions may be varied.

The bin monitoring system described above enables accurate measurement or estimation of a bin level, i.e. a level of feed in the bin. By level of feed, it is understood that this system determines the amount (mass or volume) of feed inside the bin. The system provides a cost-effective way to monitor feed levels and to notify a feed mill that more feed is required.

In one specific embodiment, the system utilizes an internet of things (IoT) printed circuit board (PCB) to harvest sensor data and to wirelessly report the data to one or more remotely located servers (or other computing devices) where the data is processed and displayed, e.g. on a dashboard or other user interface informing the user of the fill status of the feed bin. This system provides valuable insights, notifications based on user specified parameters and suggests areas for operational improvement as determined by algorithms and machine-learning which refines its models over time as it parses more data. The system in this specific implementation is solar powered and equipped with communication technologies to ensure that the system reliably transmits data at extremely long ranges while consuming very little power, enabling the system to operate potentially service-free for many years without interruption. In this specific implementation, the system includes a radio communication module. As described above, the system includes a circuit board utilizing multiple radio frequency (RF) technologies to communicate with remotely located servers. The primary method of communication employed by the circuit board in this specific implementation is cellular, e.g. LTE Category M1 which is able to operate for years on a single battery due to LTE Cat-M1's extremely power-efficient design. The system is thus capable of communicating with one or more cellular towers at ranges in excess of 25 km and utilize an already existing cellular infrastructure in order to minimize requirements and deployment complexity. In this specific implementation, the circuit board also includes an onboard Bluetooth® Low Energy (BLE) radio to support wireless configuration by sensor installers and also to provide an alternate method of mesh-network communication for future deployment in close-range scenarios. The circuit board supports the addition of alternate radio communication modules via the onboard XBee expansion headers which provide compatibility with a wide range of RF communication technologies (ZigBee, SigFox, WiFi, etc.) without requiring the hardware to be revised or redesigned, making it highly versatile.

In this one specific implementation, the PCB has incorporated a number of connection options for future-proofing and to ensure compatibility with a range of sensors and output sources. UART interfaces provide the primary method of communication with external sensors, however there are a number of other options available to provide rapid prototyping abilities. Two onboard grove connectors enable the board to be compatible with a huge range of pre-existing sensors utilizing the "Grove" communication/power standard. Inputs and Outputs connected to the onboard processor also provide the ability to read and affect the state of other connected devices.

In this one specific implementation, the circuit board operate purely on battery and solar power and has a projected lifespan of five or more years operating completely self-sufficiently. The circuit board does not require hardwiring to a power source or plugging into an electrical outlet. The ability of the system to be installed on a bin without having to hardwire to an external power source makes the system quick and easy to install by unskilled workers.

In this one specific implementation, the power system utilizes an onboard Maximum Power Point Tracking (MPPT) chip or integrated circuit (IC), designed to track and adjust the solar charging circuit to ensure charging always occurs at maximum efficiency based on weather conditions. This MPPT chip, paired with a battery capable of running for 55 or more days without sunlight, ensures long-term operation. The circuit board has been designed with diagnostic capabilities to provide early warning for power conditions which may require further attention by a service team. The circuit board may transmit wirelessly a diagnostic report to a server or remote computing device.

As noted above, in one embodiment, the sensor is a LIDAR sensor. The LIDAR sensor is able to operate for many years without requiring maintenance or service despite the dust, temperature variation and other adverse conditions inside of a feed bin. The sensor is fully enclosed by one or more quartz glass lenses. As described and illustrated, the sensor includes a self-cleaning wiper to clean the sensor's quartz glass lenses at regular intervals. As described and illustrated, the sensor is mounted to a bin using a sensor-mounting bracket. The sensor-mounting bracket enables the sensor to be mounted to any shape or size of feed bin. The sensor-mounting bracket includes a collar surrounding the feed bin lid opening. The sensor bracket hangs on this collar and fastens using compound force created by the tightening of a specialized bolt, tightened against the inside face of the lid collar. Inside of the bin, the bracket extends away from the opening to ensure that the sensor itself is protected during bin refills. This bracket enables rapid installation. The sensor wire is routed beneath the lid to the outside of the bin where it connects to the PCB and enclosure. As described above, in a second embodiment, the sensor is a time-of-flight (ToF) machine vision sensor or ToF camera. The ToF sensor utilizes a highly advanced method of ranging and profiling. The ToF sensor has demonstrated an unprecedented ability to model the surface of product inside of a feed container. Using 57,000 unique depth points the sensor is able to reconstruct a highly accurate 3D surface profile from which a precise calculation of bin volume can be determined. The number of depth points can of course be varied in other variants depending on the resolution of the particular ToF camera being used. This unique approach to feed-level monitoring enables the system to accurately identify anomalies like "feed-bridging" and "rat-holing", preventing errant or false readings. Machine vision technology will enables a completely self-sustaining and non-intrusive technology to gather accurate bin-level readings at fraction of the cost of competing technologies.

In this one specific implementation, the system enclosure includes a built-in solar panel to provide trickle charging to the enclosure battery, even in low-light situations. The enclosure has also been designed to avoid having to modify a feed bin. The mounting bracket utilizes three spherical rare-earth magnets oriented to form a low-profile tripod. This tripod orientation makes the bracket compatible with all shapes and sizes of feed bins regardless of radius or roof slope. In one specific implementation, the magnets together generate 60 lbs of holding force, enabling the entire system to be quickly installed or removed without having to permanently modify the feed bin.

Another inventive aspect of the disclosure is a method of monitoring a bin level. The method comprises steps, acts or operations of optically sensing a feed level inside a feed bin a level signal by optically sensing the feed level, processing the level signal to generate bin level data and transmitting the bin level data. The method steps, acts, or operations may be performed sequentially or concurrently, i.e. overlapping in time.

In one implementation of the method, the step of optically sensing the feed level is performed by a LIDAR sensor. In another implementation of the method, the step of optically sensing the feed level is performed by a time-of-flight (ToF) machine vision sensor.

In one implementation, the method further includes a step of cleaning a glass lens of the LIDAR sensor using a self-cleaning wiper.

In one implementation, the method further includes a step of charging a battery connected to the circuit board using a solar panel on an enclosure of the circuit board.

In one implementation, the method further includes a step of receiving the bin level data at a server, server cluster, cloud-based storage or other computing device.

In one implementation, the method further includes steps of generating and transmitting an order message by the server to order more feed. The order message may be any suitable datagram-type message transmitted electronically from the server to a computer or computing device associated with a feed mill. The message may optionally indicate how much feed is remaining in the bin and/or the date on which the feed is projected to run out. The server may also be configured to receive data from multiple bins and to compile the data to provide an aggregate assessment of how much feed is available at a particular farm and/or to predict when the feed will run out at the farm.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A bin level monitoring system comprising:
   a sensor for sensing a bin level inside a bin having a roof including a sloped portion, wherein the sensor is a volumetric level sensor;
   a circuit board communicatively connected to the sensor for receiving a level signal from the sensor and for processing the level signal to generate bin level data;
   an enclosure for enclosing the circuit board, wherein the enclosure is mounted to the sloped portion of the roof on an outside surface of the roof;
   a radio transmitter for transmitting the bin level data; and
   a sensor-mounting bracket for mounting the sensor inside the bin, the bracket including:
      an upper hanger portion that fits over an upright structural element of the roof, the hanger portion comprising a hole to receive a fastener for fastening the hanger to the upright structural element, wherein the upright structural element is a collar that surrounds a feed bin lid opening at a top of the bin;
      a vertical portion extending downwardly from the hanger;
      an angled portion extending obliquely from the vertical portion and beneath the hanger; and
      a horizontal portion extending from the angled portion and having a lower face to which the sensor is mounted;
   wherein the enclosure comprises an enclosure mounting plate having magnets for securing the enclosure to the sloped portion of the roof of the bin.

2. The bin level monitoring system of claim 1 further comprising a battery electrically connected to a socket of the circuit board for powering the circuit board.

3. The bin level monitoring system of claim 1 further comprising a server for receiving the bin level data.

4. The bin level monitoring system of claim 3 wherein the server automatically generates and transmits an order message for more feed to be delivered.

5. The bin level monitoring system of claim 1 wherein the enclosure further comprises a solar panel to charge a battery.

6. The bin level monitoring system of claim 1 wherein the sensor is a LIDAR sensor or a time-of-flight (ToF) machine vision sensor.

7. The bin level monitoring system of claim 6 wherein the LIDAR sensor comprises a glass lens and a self-cleaning wiper for cleaning the glass lens.

8. The bin level monitoring system of claim 1 wherein the circuit board comprises a maximum power point tracking (MPPT) integrated circuit.

9. The bin level monitoring system of claim 1 wherein the circuit board comprises a SIM card slot.

10. The bin level monitoring system of claim 1 wherein the hanger portion is a U-shaped hanger portion.

11. A method of monitoring a bin level of a bin having a roof, the method comprising:
   mounting a volumetric level sensor to the bin using a sensor-mounting bracket by fitting an upper hanger portion of the bracket over an upright structural element of the roof and by fastening the hanger portion to the upright structural element by inserting a fastener through a hole in the hanger portion, wherein the upright structural element is a collar that surrounds a feed bin lid opening at a top of the bin, wherein the bracket includes a vertical portion extending downwardly from the hanger portion, an angled portion extending obliquely from the vertical portion and beneath the hanger portion, and a horizontal portion extending from the angled portion and having a lower face to which the sensor is mounted;
   mounting an enclosure enclosing a circuit board to a sloped portion of the roof on an outside surface of the roof;
   sensing the bin level inside the bin using the sensor;
   receiving a level signal by sensing the bin level;
   processing the level signal to generate bin level data;
   transmitting the bin level data;
   wherein the mounting of the enclosure to the sloped portion of said roof is performed by securing an enclosure mounting plate having magnets to said sloped portion of the roof of the bin.

12. The method of claim 11 wherein sensing the bin level is performed using a LIDAR sensor or a time-of-flight (ToF) machine vision sensor.

13. The method of claim 12 further comprising cleaning a glass lens of the LIDAR sensor using a self-cleaning wiper.

14. The method of claim 11 further comprising charging a battery connected to the circuit board using a solar panel on the enclosure of the circuit board.

15. A bin level monitoring system comprising:
   a sensor for sensing a bin level inside a bin having a roof including a sloped portion, wherein the sensor is a volumetric level sensor;
   a circuit board communicatively connected to the sensor for receiving a level signal from the sensor and for processing the level signal to generate bin level data;
   an enclosure for enclosing the circuit board, wherein the enclosure is mounted to the sloped portion of the roof on an outside surface of the roof;
   a radio transmitter for transmitting the bin level data; and
   a sensor-mounting bracket for mounting the sensor inside the bin, the bracket including:
      an upper hanger portion that fits over an upright structural element of the roof, wherein the upright structural element is a collar that surrounds a feed bin lid opening at a top of the bin, the hanger portion fastening the hanger to the upright structural element;
      a vertical portion extending downwardly from the hanger for supporting the sensor;
   wherein the enclosure comprises an enclosure mounting plate for securing the enclosure to the sloped portion of the roof of the bin.

16. The bin level monitoring system of claim 15 wherein the sensor is a LIDAR sensor or a time-of-flight (ToF) machine vision sensor.

17. The bin level monitoring system of claim 15 further comprising a server for receiving the bin level data.

18. The bin level monitoring system of claim 17 wherein the server automatically generates and transmits an order message for more feed to be delivered.

* * * * *